(12) United States Patent
Sharma et al.

(10) Patent No.: US 9,872,195 B2
(45) Date of Patent: Jan. 16, 2018

(54) METHOD AND SYSTEM FOR PROVIDING DATA COMMUNICATION THROUGH A CLUSTER HEAD FOR MACHINE TYPE COMMUNICATION (MTC) BASED GROUP COMMUNICATION

(71) Applicant: Samsung Electronics Co., Ltd., Suwon-si, Gyeonggi-do (KR)

(72) Inventors: Diwakar Sharma, Bangalore (IN); Karthik Rangaraj Manavalan, Bangalore (IN); Yamini Harikrishnan, Bangalore (IN)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 97 days.

(21) Appl. No.: 14/684,205

(22) Filed: Apr. 10, 2015

(65) Prior Publication Data

US 2015/0296404 A1  Oct. 15, 2015

(30) Foreign Application Priority Data

Apr. 10, 2014 (IN) .......................... 1894/CHE/2014
Mar. 16, 2015 (KR) ........................ 10-2015-0036108

(51) Int. Cl.
*H04L 12/26* (2006.01)
*H04W 28/02* (2009.01)
(Continued)

(52) U.S. Cl.
CPC ....... *H04W 28/0215* (2013.01); *H04W 4/005* (2013.01); *H04W 28/0236* (2013.01); *H04W 72/00* (2013.01); *H04W 74/0833* (2013.01)

(58) Field of Classification Search
USPC ................ 370/230–294, 329; 455/450–509; 709/221–241
See application file for complete search history.

(56) References Cited

U.S. PATENT DOCUMENTS 7,894,371 B2 * 2/2011 Bonta .................. H04W 74/02
370/254
8,340,029 B2 * 12/2012 Chion .................. H04W 72/04
370/312
(Continued)

FOREIGN PATENT DOCUMENTS

WO  WO 2011/087826 A1  7/2011
WO  WO 2013/131264 A1  9/2013

OTHER PUBLICATIONS

International Search Report dated Jul. 16, 2015 in connection with International Application PCT/KR2015/003631; 3 pages.
(Continued)

*Primary Examiner* — Man Phan

(57) ABSTRACT

A method and system for providing data communication for machine type communication (MTC) devices based wireless communication. The method comprises selecting at least one cluster head for a plurality of clusters, receiving by the cluster head a data traffic transfer request from the one or more MTC devices determining availability of a network resources for transferring the data traffic, establishing a dedicated connection with a base station for transferring the data traffic from the MTC devices to the base station through the connection established between the cluster head and the base station. The data traffic transfer request comprises one of an activation status, a buffer occupancy status and a delay tolerance of the one or more MTC devices.

27 Claims, 16 Drawing Sheets

(51) Int. Cl.
*H04W 4/00* (2009.01)
*H04W 72/00* (2009.01)
*H04W 74/08* (2009.01)

(56) References Cited

U.S. PATENT DOCUMENTS

| | | | | |
|---|---|---|---|---|
| 8,891,423 B2* | 11/2014 | Shaheen | ............... | H04W 4/005 370/311 |
| 8,918,111 B2* | 12/2014 | Shin | ............... | H04W 4/005 455/450 |
| 9,014,117 B2* | 4/2015 | Chion | ............... | H04W 72/04 370/312 |
| 2007/0058665 A1 | 3/2007 | Ho et al. | | |
| 2009/0034432 A1 | 2/2009 | Bonta et al. | | |
| 2013/0107797 A1 | 5/2013 | Chion et al. | | |
| 2013/0150061 A1 | 6/2013 | Shin et al. | | |
| 2013/0212219 A1 | 8/2013 | Koskela et al. | | |
| 2013/0336206 A1 | 12/2013 | Farhadi | | |
| 2014/0092833 A1* | 4/2014 | Vannithamby | .... | H04W 52/0258 370/329 |
| 2014/0094183 A1* | 4/2014 | Gao | ............... | H04W 72/048 455/450 |
| 2014/0233515 A1* | 8/2014 | Chen | ............... | H04W 4/005 370/329 |
| 2014/0376426 A1* | 12/2014 | Boudreau | ............... | H04L 47/41 370/294 |
| 2015/0289080 A1* | 10/2015 | Wu | ............... | H04W 76/02 370/329 |
| 2016/0174205 A1* | 6/2016 | Maaref | ............... | H04W 4/005 370/329 |

OTHER PUBLICATIONS

International Written Opinion dated Jul. 16, 2015 in connection with International Application PCT/KR2015/003631; 6 pages.

Wei et al., "Enabling Dense Machine-to-Machine Communications Through Interference-Controlled Clustering"; 2012 8th International Wireless Communications and Mobile Computing Conference (IWCMC); Limassol, Cyprus; Aug. 27-31, 2012; 6 pages.

Wang et al.; "Random Access Design for Clustered Wireless Machine to Machine Networks"; 2013 First International Black Sea Conference on Communications and Networking (BlackSeaCom); Batumi, Georgia; Jul. 3-5, 2013; 5 pages.

Foreign Communication from Related Counterpart Application; European Patent Application No. 15776476.2; Extended European Search Report and European Search Opinion dated Nov. 6, 2017; 11 pages.

* cited by examiner

METHOD AND SYSTEM FOR PROVIDING DATA COMMUNICATION THROUGH A CLUSTER HEAD FOR MACHINE TYPE COMMUNICATION (MTC) BASED GROUP COMMUNICATION

CROSS-REFERENCE TO RELATED APPLICATION AND CLAIM OF PRIORITY

The present application is related to and claims priority under 35 U.S.C. §119(a) to Indian Patent Application Serial No. 1894/CHE/2014, which was filed in the Indian Patent Office on Apr. 10, 2014 and Korean Application Serial No. 10-2015-0036108, which was filed in the Korean Intellectual Property Office on Mar. 16, 2015, the entire content of which is hereby incorporated by reference.

TECHNICAL FIELD

The present disclosure relates to the field of machine type communications (MTC), and more particularly relates to a method and system for enabling data communication through a cluster head via a dedicated connection for MTC based group communications.

BACKGROUND

Machine-to Machine (M2M)/Machine Type Communications (MTC) applications are applications where machines communicate with each other directly without human intervention. Examples of applications include smart metering, safety applications, health monitoring, fleet management, data applications and remote applications.

The MTC devices can be embedded in cars, consumer electronic devices, vending devices, etc. These devices are large in number and are wide spread. The applications should communicate through widely deployed networks connecting the MTC devices to the Internet forming Internet of Things (IoT). While some existing MTC deployments use short range communications, it would be ideal to use cellular networks as the infrastructure is established in a stable manner and can support a large number of MTC devices.

The enormous amount of signaling flow generated by the large number of MTC devices trying to connect to the network at the same time leads to congestion in radio access network (RAN) and the core network (CN). This in turn causes intolerable delays, packet loss and also service unavailability. Also, congestion in MTC would also affect the non MTC devices.

Generally at the RAN side, the congestion occurs when a large number of MTC devices try to communicate concurrently with the eNodeB. For example, MTC devices which are used for monitoring (bridge monitoring or rainfall/flood monitoring) will transmit the monitored data concurrently. As the devices are connected to the same eNodeB, using the same common channels (Random accesses), can lead to congestion. Consequently the network should be optimized to support these communication requests from the devices simultaneously.

In Release 11, 3GPP System Architecture working group 1 (SA1) has defined system aspects and technical specifications for MTC device to device communication, group based services and possible enhancements to improve the network for MTC. Various solutions such as Access Class Barring schemes, Separate Random Access Channel (RACH) resources for MTC, Dynamic allocation of RACH resources, MTC Specific Back off scheme, slotted access and the like are proposed by the 3GPP to overcome the problem of congestion. These solutions from 3GPP will distribute the RACH load. However, in case of super dense deployment of Pico cells it will either impair the M2M devices or Human to Human (H2H) users.

The deployment scenarios herein take into consideration a combination environment where there is constant movement of MTC devices alongside the static MTC devices. This creates congestion at the RAN due to random access contention during uplink transmission where multiple MTC devices try to send data to the network. Further, during downlink transmission and capacity should be improved while supporting large number of MTC devices along with the existing H2H interaction in downlink transmission. Further, the RACH burst from MTC devices will overload the RACH access at eNodeB which deprives the cellular users from normal service due to overloading of RACH by a higher density of M2M devices.

In view of the foregoing, there is a need for an MTC device friendly system and method for minimizing RACH load and provide accesses to MTC devices in MTC based communication.

SUMMARY

To address the above-discussed deficiencies, it is a primary object to provide, for use in a method and system for providing data communication for machine type communication (MTC) devices. The method comprising the selecting, at least one cluster head, receiving a data traffic transfer request from the one or more MTC devices by the cluster head and determining the availability of one or more network resources for transferring the data traffic. The cluster head then establishes a dedicated connection with a base station for transferring the data traffic from the one or more MTC devices to the base station based on the availability of the one or more network resources. The data transfer request comprises at least one of an activation status, a buffer occupancy status and a delay tolerance of the one or more MTC devices.

According to an embodiment of the present disclosure, determining availability of base station resources for transferring data traffic comprises creating a priority list of active MTC devices based on the delay tolerance, comparing the delay tolerance of the active MTC devices with a time required for establishing a connection with a base station, triggering a connection request with the base station when the delay tolerance for a high priority MTC device is equal to the pre-set time and establishing a dedicated connection with the base station for transferring the data traffic. The delay tolerance herein is defined as a total tolerable time of communication without impacting a quality of service for the MTC member device.

According to an embodiment of the present disclosure, the method further comprises of sending, by the cluster head, at least one of an ACK or NACK message from the base station through the dedicated connection established between the cluster head and the base station and relaying at least one of an ACK or NACK message from the base station to a corresponding MTC device.

According to an embodiment of the present disclosure, the cluster head establishes and releases the dedicated connection with the base station based on an incoming traffic from the one or more MTC devices.

According to an embodiment of the present disclosure, the preset time is the time interval required for the establishment of dedicated connection between the cluster head and the base station.

According to an embodiment of the present disclosure, the method further comprises of sub-clustering a plurality of MTC devices within a cluster based on a first set of parameters. The first set of parameters comprises a congestion level and Signal-to-Noise Ratio (SINR) associated with the plurality of MTC devices.

According to an embodiment of the present disclosure, the congestion level based sub-cluster formation is performed based on a load index, wherein the load index is an average of a resource utilization at the base station.

According to an embodiment of the present disclosure, the method further comprises of calculating the load index of a selected base station and redirecting one or more MTC devices from a first base station to a second base station if the load index of the second base station is greater than a previous load index and less than a maximum load index, wherein the maximum load index is associated with a maximum availability of network resources.

According to an embodiment of the present disclosure, the method further comprises redirecting one or more MTC devices from the first base station to the second base station having a load index between the maximum load index and a minimum load index, if the load index of the first base station is less than the previous load index and is equal to or less than the minimum load index. The minimum load index is associated with the minimum availability of network resources.

According to an embodiment of the present disclosure, the method further comprises redirecting one or more MTC devices from the first base station to the second base station if the load index of the first base station is greater than the maximum load index and shutting down the primary base station.

According to an embodiment of the present disclosure, the SINR based sub-cluster formation comprises of measuring the SINR by each MTC device with respect to each base station, reporting the SINR value to a serving base station, sharing the SINR report with a plurality of neighboring base stations by the serving base station, sorting, by each base station, the reported SINR for the one or more MTC devices with respect to each base station and creating a sub-cluster based on the common SINR sequence for the one or more MTC devices with respect to each base station.

According to an embodiment of the present disclosure, the cluster head have the highest SINR with serving cell and have decreasing order of SINR for the neighboring base stations or cooperative base stations which are jointly serving cluster head.

The embodiments herein further disclose a method for providing data communication for machine type communication (MTC) devices for multiple base-stations in a wireless communication. The method comprising informing, by a cluster head, to one or more MTC devices in a cluster a primary base station to which each MTC device is assigned, updating an activation status of the one or more MTC devices to the cluster head by each of the MTC device, requesting for a network resource from a particular base station whenever a transmission is ready for a sub-cluster MTC device, requesting for a secondary base station, by the primary base station, if there is a disruption in communication due to unavailability of network resources, shifting the one or more MTC devices from a sub-cluster corresponding to the primary base station to a sub-cluster corresponding to the secondary base station, wherein the shifting occurs when a half of a delay tolerance associated with the one or more MTC devices is over and the MTC device does not get the network resources associated with the base station and informing by the cluster head of the secondary base station on which one or more MTC devices corresponding to the sub-cluster can shift.

The various embodiments herein further describe a method for providing data communication for machine type communication (MTC) devices with multiple base-stations in a wireless communication. The method comprising informing, by a sub-cluster head, to one or more MTC devices in a cluster a primary base station to which each MTC device is assigned, updating an activation status of the MTC device to the sub-cluster head by each of the MTC device, requesting for a network resource from a particular base station whenever a transmission is ready for a sub-cluster MTC device, requesting for a secondary base station, by the primary base station, if there is a disruption in communication due to unavailability of network resources, providing information of the secondary base station from which the sub-cluster head can initiate MTC communication, searching for the sub-cluster head which is linked to the secondary base station in the grouping information, shifting the one or more MTC devices from a sub-cluster corresponding to the primary base station to a sub-cluster corresponding to the secondary base station, informing by the sub-cluster head of the secondary base station on which one or more MTC devices corresponding to the sub-cluster can shift and initiating data traffic transfer from the one or more MTC devices to the secondary base station through the connection established between the sub-cluster head and the secondary base station.

According to an embodiment of the present disclosure, the sub-cluster head request for the secondary base station when a half of a delay tolerance associated with the one or more MTC devices is over and the MTC device does not get the network resources associated with the base station.

According to an embodiment of the present disclosure, the method further comprises providing the information of the one or more MTC devices that require network resources to the sub-cluster corresponding to the secondary base station, storing the one or more MTC devices that require network resources as sub-cluster members and requesting for network resources from the secondary base station by the sub-cluster head.

According to an embodiment of the present disclosure, each sub-cluster head serving one or more related MTC devices is connected to a serving base station through a dedication connection.

According to an embodiment of the present disclosure, the method further comprises providing grouping information of secondary MTC devices to the plurality of MTC devices in the cluster. The grouping information informs the MTC device which base station is associated to which MTC device and enabling the MTC devices of one sub-cluster to join another sub-cluster through one or more MTC devices using a device to device communication.

According to an embodiment of the present disclosure, the MTC devices of one sub-cluster joins another sub-cluster through the device to device communication during at least one of an expiry of the delay tolerance of the MTC device and the MTC device is in a sub-cluster does not get resources from the associated base station and if the sub-cluster head connected to macro base station cannot serve the MTC device in the sub-cluster.

Embodiments herein further describe a method for providing data communication for machine type communication (MTC) devices in a group-based wireless communication. The method comprising selecting, at least one cluster head for a plurality of clusters, wherein each of the plurality of clusters comprises one or more MTC devices which are members of a cluster associated with the cluster head, receiving, by the cluster head, a message from the one or more MTC devices for data traffic transfer when the one or more MTC devices are activated, wherein the message comprises at least one of an activation status, a buffer occupancy status and a delay tolerance of the one or more MTC devices, determining availability of a network resources for transferring the data traffic based on the buffer occupancy status of the one or more MTC devices, establishing a dedicated connection with a base station for transferring the data traffic and transferring the data traffic from the one or more MTC devices to the base station through the connection established between the cluster head and the base station.

Embodiments herein further provide a system for providing data communication for machine type communication (MTC) devices in a group-based wireless communication. The system comprising at least one network element adapted for selecting, at least one cluster head for a plurality of clusters, wherein each of the plurality of clusters comprises one or more MTC devices which are members of a cluster associated with the cluster head, receiving a message from the one or more MTC devices for data traffic transfer when the one or more MTC devices are activated, wherein the message comprises at least one of an activation status, a buffer occupancy status and a delay tolerance of the one or more MTC devices, determining availability of a network resources for transferring the data traffic based on the buffer occupancy status of the one or more MTC devices, establishing a dedicated connection with a base station for transferring the data traffic and transferring the data traffic from the one or more MTC devices to the base station through the connection established between the cluster head and the base station. The delay tolerance is defined as a total tolerable time of communication without impacting a quality of service for the MTC member device.

According to an embodiment of the present disclosure, the system further comprises at least one element adapted for performing sub-clustering of the plurality of MTC devices within a cluster based on a first set of parameters. The first set of parameters comprises a congestion level and Signal-to-noise ratio (SINR) associated with the plurality of MTC devices.

The foregoing has outlined, in general, the various aspects of the disclosure and is to serve as an aid to better understanding the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The other objects, features and advantages will occur to those skilled in the art from the following description of the preferred embodiment and the accompanying drawings in which.

Figure 1:
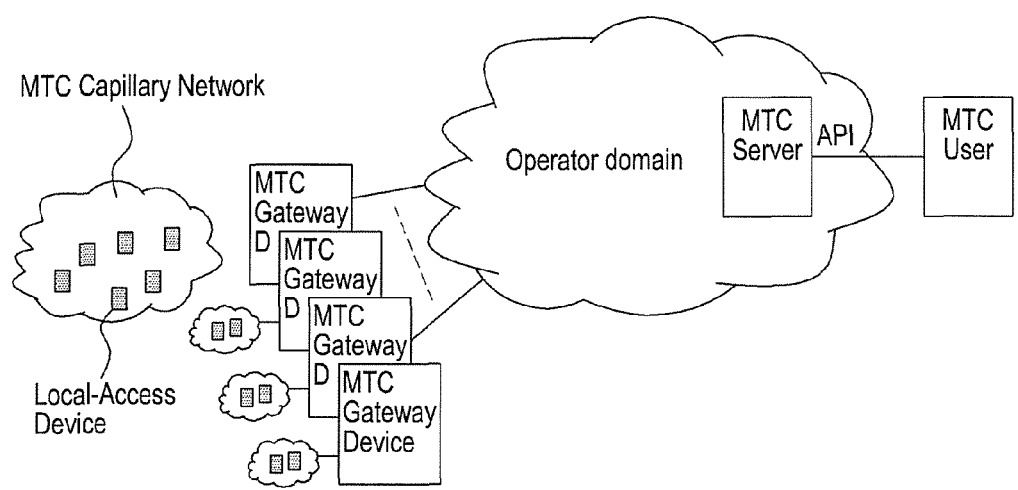
FIG. 1 illustrates a high-level architecture of an LTE system according to an embodiment of the present disclosure.

Although specific features of the present disclosure are shown in some drawings and not in others. This is done for convenience only as each feature may be combined with any or all of the other features in accordance with the present disclosure.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

The embodiments of the present disclosure will now be described in detail with reference to the accompanying drawings. However, the present disclosure is not limited to the embodiments. The present disclosure can be modified in various forms. Thus, the embodiments of the present disclosure are only provided to explain more clearly the present disclosure to the ordinarily skilled in the art of the present disclosure. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a high-level architecture of an LTE system, illustrating a working environment according to an embodiment of the present disclosure. The MTC Gateway is a type of MTC device with 3GPP mobile communication capability. The MTC Gateway connects to the MTC Capillary network which contains local access devices using short range technologies for communication. The MTC Gateway device acts as a middle agent between the local access devices and the MTC Server. The MTC Server operates within the 3GPP network.

Figure 2:
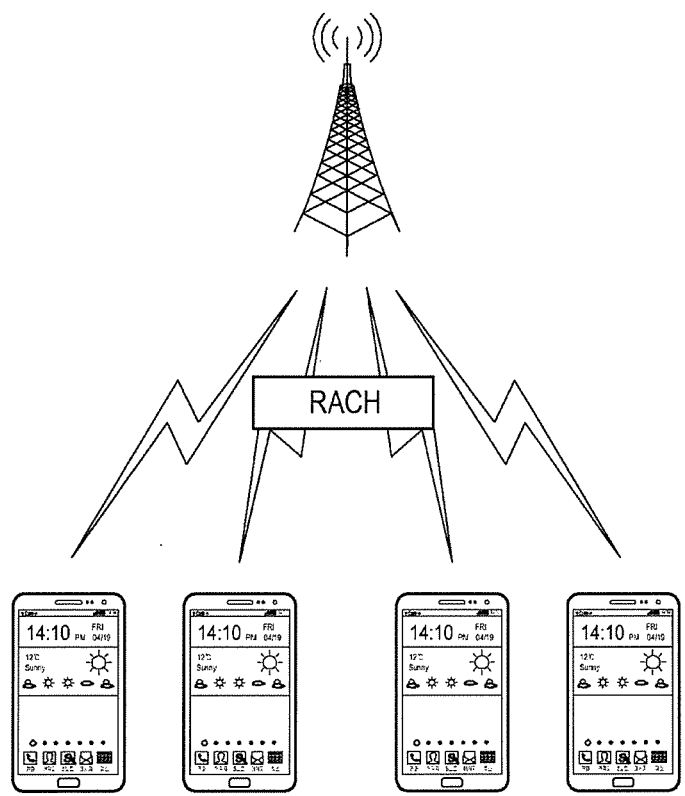
FIG. 2 is a scenario diagram illustrating the RAN overload problem due to requests from the MTC devices.

FIG. 2 is a scenario diagram illustrating the RAN overload problem due to requests from the MTC devices. The plurality of MTC devices are generally deployed in massive numbers. Consequently the RACH burst from MTC devices overloads the RACH access at the eNodeB. This in turn deprives cellular users from normal service due to overloading of RACH by a higher density of M2M devices.

Figure 3:
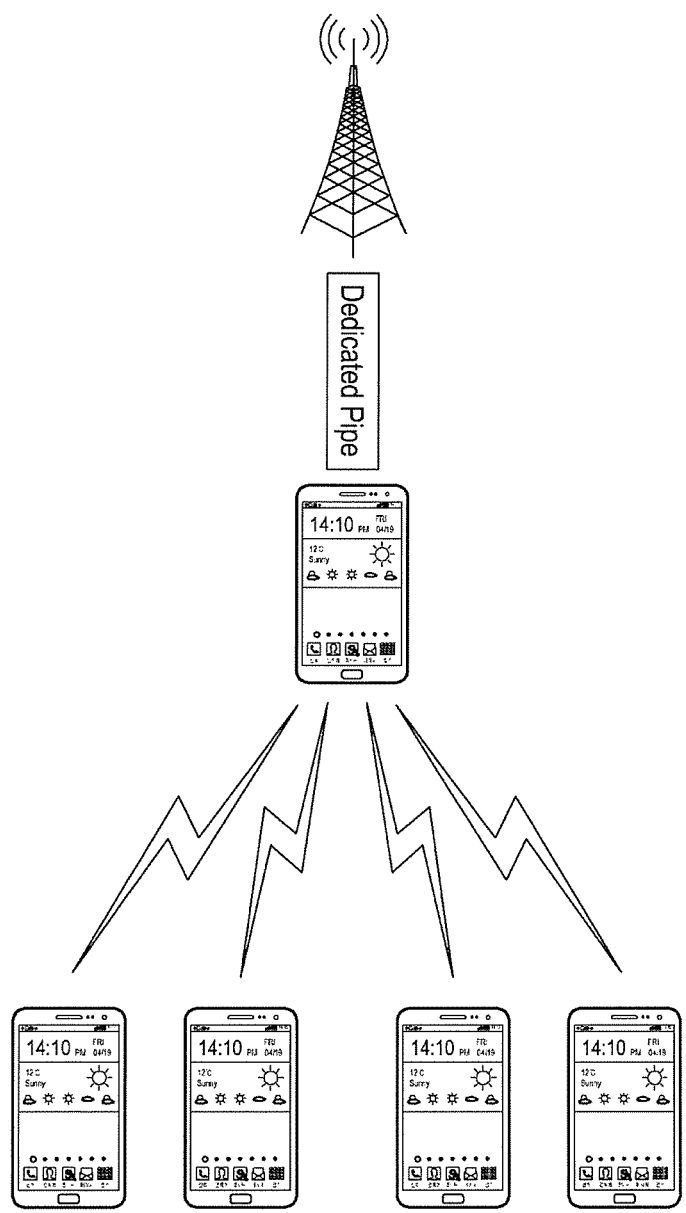
FIG. 3 is a scenario diagram illustrating a method of communicating data to MTC devices through a dedicated connection with the cluster head according to an embodiment of the present disclosure.

FIG. 3 is a scenario diagram illustrating a method of communicating data to MTC devices through a dedicated connection with the cluster head, according to an embodiment of the present disclosure. The user equipment establishes a dedicated connection from a cluster head to the eNodeB based on a pattern of the data traffic received from the MTC devices. Similarly, the UE releases the dedicated connection based on the traffic pattern of the MTC devices. The traffic pattern should provide a duration of a dedicated RRC connection since most of the traffic is expected to be intermittent in nature. In order to release the dedicated connection, the cluster head uses the RRC connection release timer.

The dedicated connection established between the cluster head the eNodeB as shown in FIG. 3, provides continuous flow of traffic from cluster head to eNodeB, thereby minimizing the RACH access for RRC Connection, brings more adaptive power control between MTC device and eNodeB for MTC traffic and reduces the latency to access the eNodeB.

Figure 4:
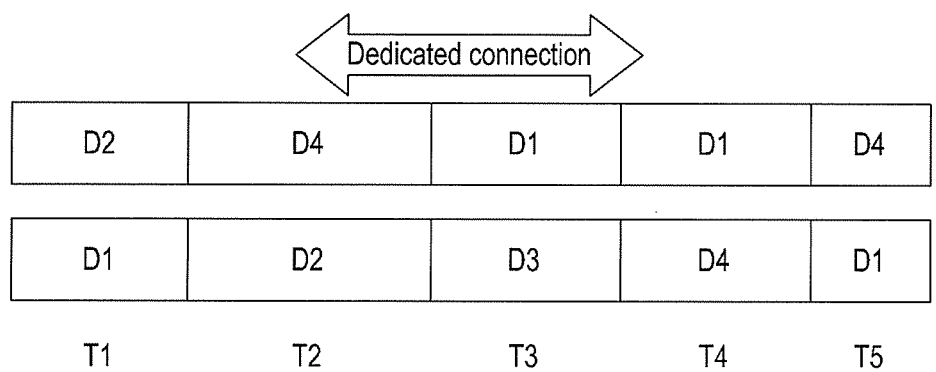
FIG. 4 is a schematic diagram illustrating a RAN overload problem solution by using a dedicated connection between the MTC device and the cluster head according to an embodiment of the present disclosure.

FIG. 4 illustrates a RAN overload problem solution by using a dedicated connection between the MTC device and the cluster head, according to an embodiment of the present disclosure. At a time instance T1, a dedicated connection is assumed to be established between the cluster head and the base station and the MTC devices D1 and D2 will be active for MTC transmission/reception. Here the data from D2 and D1 devices will be either carried/received through the cluster head. The embodiments herein avoid the opportunistic RACH transmission to the base station, thereby preventing the overload at RAN. The dedicated connection between the cluster head and base station to carry data from the MTC devices that are associated with the cluster head to come under the vicinity of the cluster head.

Figure 5:
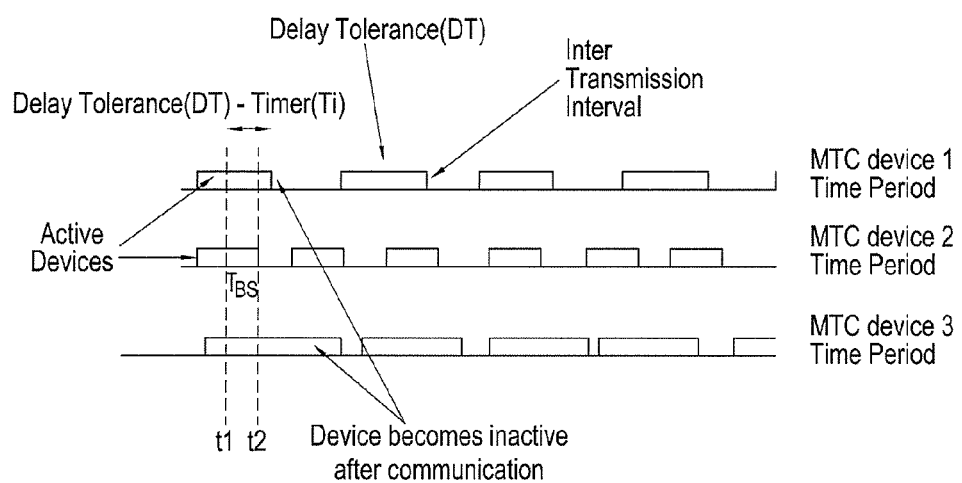
FIG. 5 is a schematic representation of a timing diagram for single base station based MTC communication, according to an embodiment of the present disclosure.

FIG. 5 is a schematic representation of a timing diagram for single base station based MTC communication, according to an embodiment of the present disclosure. The MTC devices herein corresponds to cluster members of a cluster wherein the cluster members updates the cluster head of its activation status, the buffer occupancy and delay tolerance once the cluster members are activated. The cluster head prepares a priority list of the active MTC devices based on their delay tolerances left. For instance, let $T_{BS}$ be the time required for establishing a dedicated connection between the cluster head and the base station. The delay tolerance left of the higher priority device is then with the $T_{BS}$. The channel head triggers a connection request with the base station, when the delay tolerance left for the higher priority device is equal to the $T_{BS}$. The channel head then asks for the network resources with a buffer occupancy $BO_{Total}$. Here, the buffer occupancy is defined as:

$$BO_{total} = \Sigma_{i=1}^{n} BO_i,$$

where i=1 to N, and N is the maximum number of active cluster members.

At instant t1, the channel head triggers connection request to base station as the delay tolerance left for device 2 (the highest priority device at that instant) becomes equal to $T_{BS}$. At instant t2, the channel head sends a buffer occupancy report to eNB, which is summation of all buffer occupancy of the plurality of MTC devices at the eNB. For example, if the buffer occupancy for device $D_i$ is $BO_i$, then $BO_{total} = \Sigma_{i=1}^{n} BO_i$. At instant t2, the data transfer occurs through a dedicated connection formed between the channel head and the network.

Figure 6:
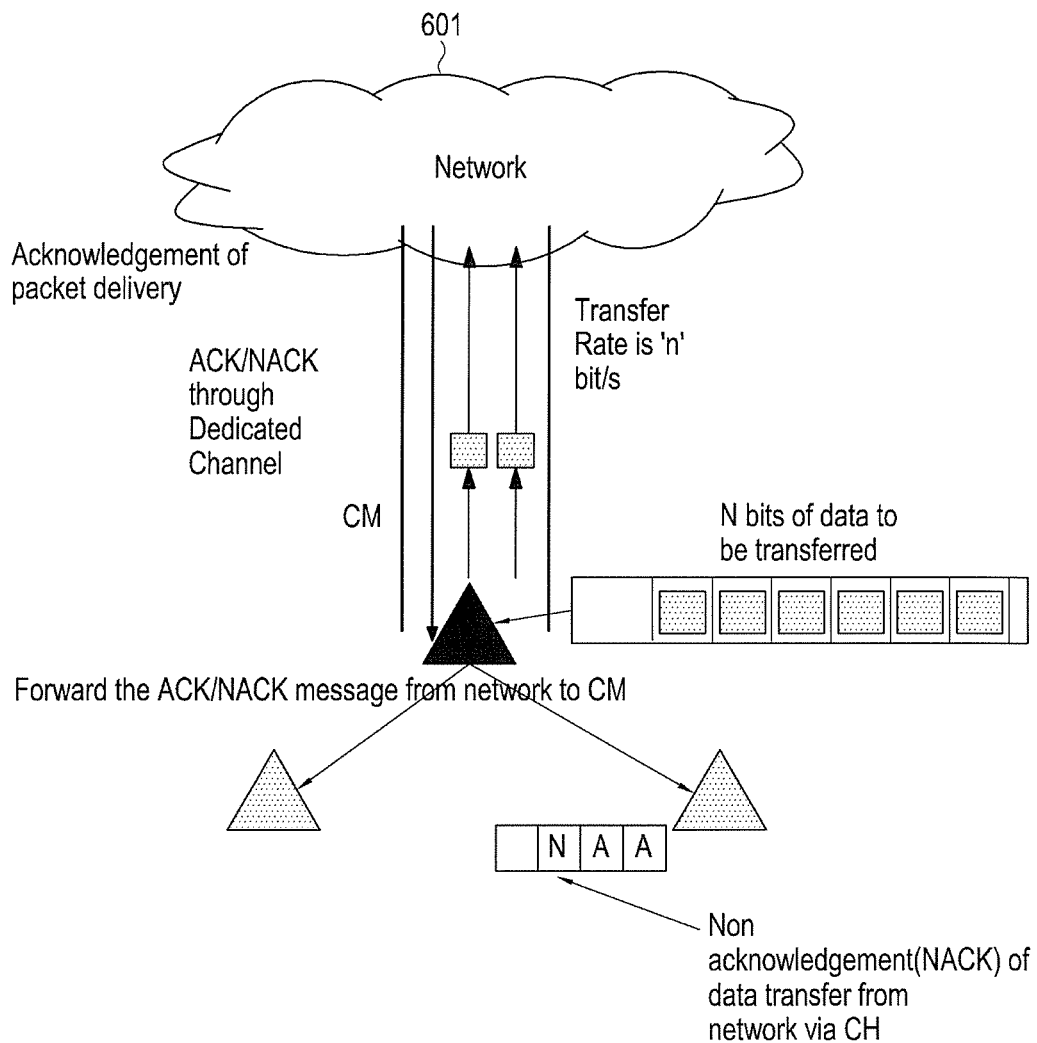
FIG. 6 is a scenario diagram illustrating data transmission for single base station based MTC communication, according to an embodiment of the present disclosure.

FIG. 6 is a scenario diagram illustrating data transmission for single base station based MTC communication, according to an embodiment of the present disclosure.

Figure 7:
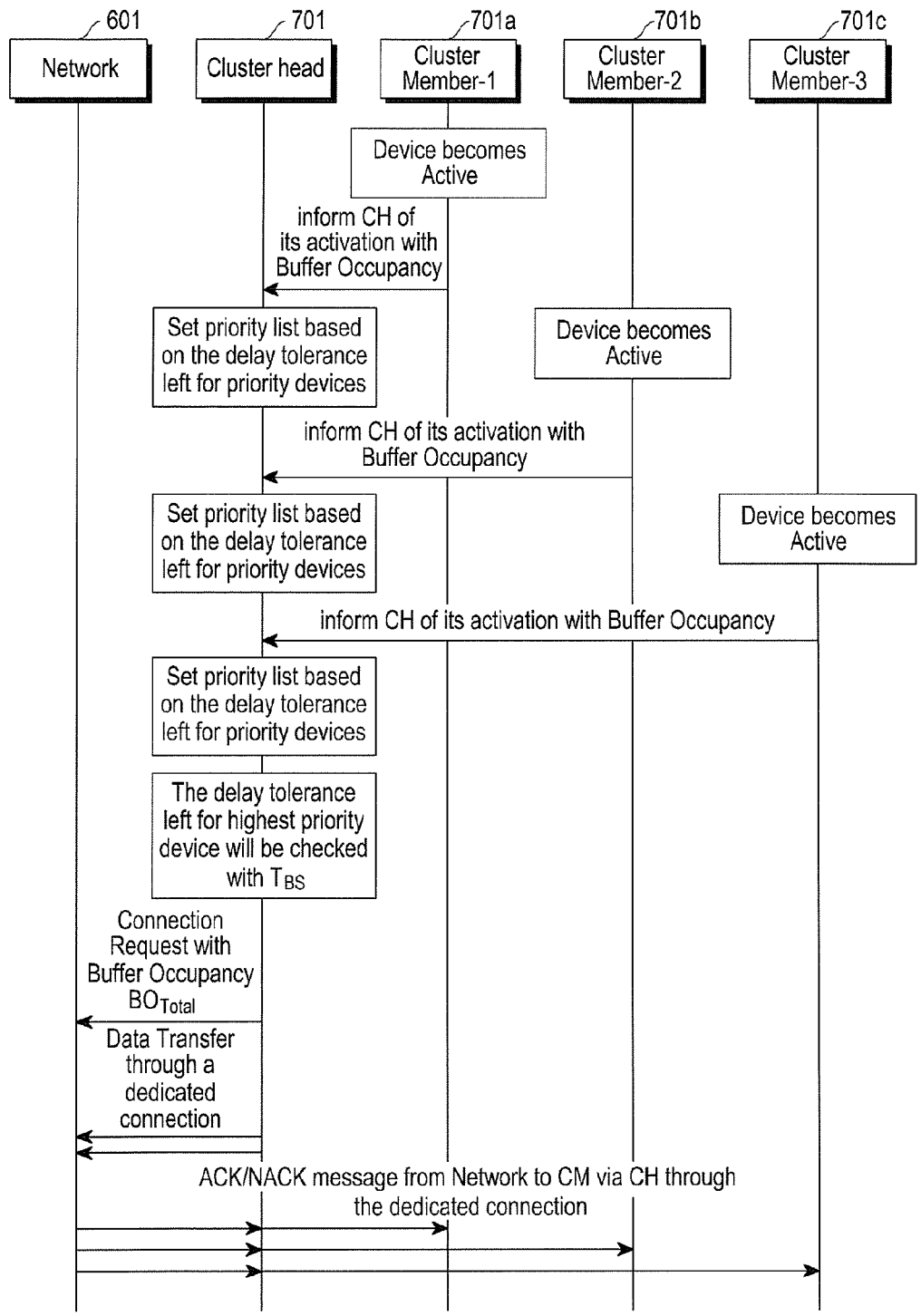
FIG. 7 is a flow diagram illustrating a messaging sequence for MTC dedicated connection based communication, according to an embodiment of the present disclosure.

Acknowledgement of Packet Delivery (ACK) or Non-Acknowledgement of Packet Delivery (NACK) message from the network 601 is received through the dedicated channel established between the cluster head 701 (ref: FIG. 7) and the network (eNB) 601. The cluster head 701 then relay the ACK/NACK message from the network to the respective MTC devices.

FIG. 7 is a flow diagram illustrating a messaging sequence for MTC dedicated connection based communication, according to an embodiment of the present disclosure. When one or more MTC devices/Cluster members CM-1, CM-2 and CM-3 701a, 701b and 701c respectively sends a message to the selected cluster head 701 for data transfer when the one or more MTC devices are activated. The message comprises the activation status, the buffer occupancy status and the delay tolerance left of the one or more MTC devices. The channel head 701 then creates a priority list of active MTC devices based on the delay tolerance. The delay tolerance is defined as a total tolerable time of communication without impacting a quality of service for the MTC member device, The cluster head 701 then compares the delay tolerance of the active MTC devices with a time required for establishing a connection with a base station, triggers a connection request with the base station when the delay tolerance for a high priority MTC device is equal to a pre-set time.

Network 601 further determines the availability of network resources for transferring the data traffic based on the buffer occupancy status of the plurality of MTC devices, And cluster head 701 further establishes a dedicated connection with the base station for transferring the data traffic. The cluster head 701 then receives at least one of an ACK or NACK message from the base station through the dedicated connection established between the cluster head 701 and the base station and relay at least one of an ACK or NACK message from the base station to a corresponding MTC device.

Figure 8:
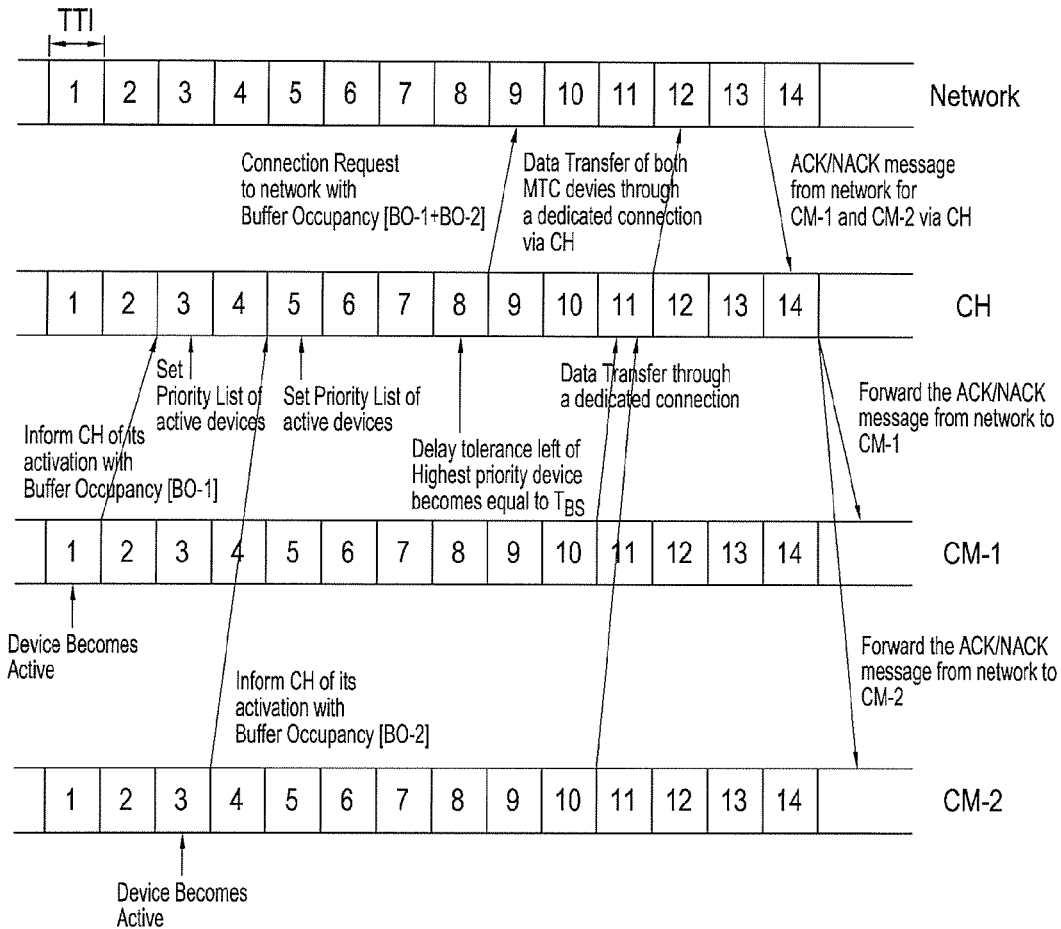
FIG. 8 is a schematic representation of a timing diagram for MTC dedicated connection based communication, according to an embodiment of the present disclosure.

FIG. 8 is a schematic representation of a timing diagram for MTC dedicated connection based communication, according to an embodiment of the present disclosure. The timing diagram illustrates the various activities or actions performed by each of the cluster member or MTC device, cluster head and the network and their time instances.

Figure 9:
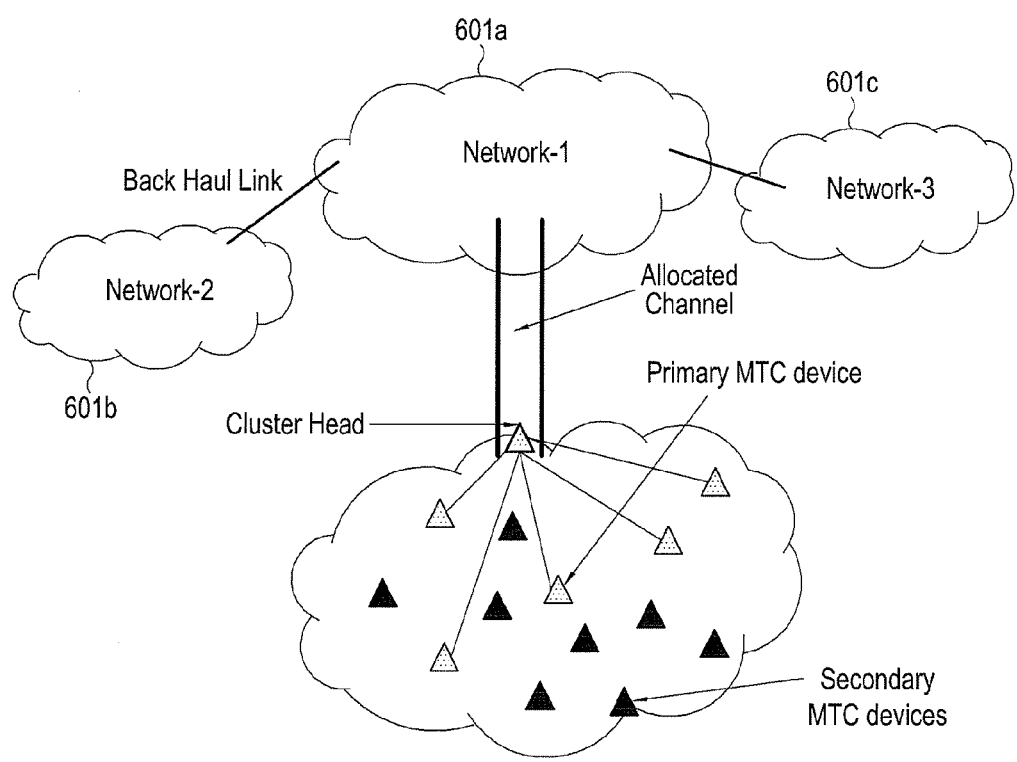
FIG. 9 is a scenario diagram illustrating data transmission for multiple base stations dedicated connection based communication for MTC devices according to an embodiment of the present disclosure.

FIG. 9 is a scenario diagram illustrating data transmission for multiple base stations dedicated connection based communication for MTC devices, according to an embodiment of the present disclosure. According to an embodiment of the present disclosure, the following factors are taken into consideration according to the standards for clustering procedure in a multi-station based scenario. Consider, $CH_i$ be the cluster head of cluster i, where i=1, 2, ... n, N be the total number of MTC devices in the system and $N_i$ be the number of devices in cluster i. The $N_i$ devices are connected by short range communication using single hop. The short range technology which dictates the transmission range between de Out of $N_i$ devices, there are S devices serving safety applications, P devices serving periodic applications, NP devices serving non periodic applications and D devices serving non real time and real time applications. vices is assumed to be $T_R$ in meters. Each $CH_i$ maintains four queues one for each application S, P, NP and D. A MTC device can be in any one of state such as a cluster member (CLM) or a cluster head (CH). The MTC device can either be an active device where it has its own application running with service requests to send or receive data or a passive device where there is no current data transmission.

Consider $BS_j$, $BS_{j+1}$ ... $BS_m$ be the base stations in the system where j=1, 2, ... m. $CH_i$ be under the coverage range of multiple base stations $BS_k$ (where k∈{j+1, j+2 ... m}). The method for selecting a cluster head considers four main parameters mobility of the device, drain rate of the device, Signal to Noise Ratio and Passive Device. A weight factor is chosen for each metric dependent based on system requirements and is combined with the system parameters effectively. The method uses a combined weight metric of the above four parameters to select a cluster head. The MTC device with the highest weight is chosen as a cluster head 701. For determining the SINR parameter, any device which is closer to the BS is assumed to have good SINR values and higher data rates and will be chosen as a candidate for CH. In multi base station scenario, the BSj with which the $CH_i$ has a higher SINR value is selected as a Master BS. The remaining BSs which cover $CH_i$ are considered as Secondary BSs. A ranking table is generated by the CHi with a list of BS sorted in the descending order of SINR values. The first $BS_j$ in the list is the Master BS and second $BS_{j+1}$ is the first secondary and so on. This list will cover the entire BSs with which CHi has coverage. Further a group of Secondary BSs referred to as "candidate Secondary BSs" are determined from the SINR ranking table, Quality of Service (QOS) requirement of the $CH_i$ and resource availability at each secondary BS. For delay non-sensitive applications, a low SINR is tolerable but for delay sensitive applications SINR is taken at priority. So, in all, cooperation of BS should be based on nature of the application.

The Master BS together with candidate Secondary BSs forms a virtual cell for the $CH_i$. The CSI (CQI/PMI/RI) of the UE is exchanged between the BSs of the virtual cell to co-ordinate between the BS. Consider R; is the data rate between $CH_i$ and $BS_j$ in bits/second. The rate Ri is decided based on the physical channel conditions between $CH_i$ and $BS_j$, λ1, λ2 ... λNi is the mean arrival rate of the data in the devices being served by $CH_i$, assuming the arrival rates are in poisson process and μi is the mean service rate for $CH_i$ offered by the $BS_j$. $\Sigma_{i=1}^{N_i} \lambda_i \leq \mu_i$; where the sum of the arrival rate of the packets at $CH_i$ queue should be less than or equal to the mean service rate offered by the $BS_j$ to $CH_i$. Let $RA_i$ be the resources allocated to $CH_i$, δS, δP, δNP and δD, be the delay tolerance for S, P, NP and D applications and E (DELa) be the expected delay for the application a (where a ∈{S,P,NP,D}). It is defined as sum of the queuing delay at the cluster head, transmission delay and propagation delay.

a. E (DELa) for each application type should satisfy the following constraints:
   a. E(DELS)≤δS
   b. E(DELP)≤δP
   c. E(DELNP)≤δNP
   d. E(DELD)≤δD
b. Let βS, βP, βNP and βD, be the packet loss ratio tolerance for S, P, NP and D applications.
c. Let EPLR(.) be the expected packet loss ratio of application (.) and is defined as the ratio of number of packets lost to the total number of packets transmitted.
d. EPLR (.) for each application type should satisfy the following constraints
   a. EPLR(S)≤β S
   b. EPLR(P)≤β P
   c. EPLR(NP)≤β NP
   d. EPLR(D)≤β D In this scenario, the mean arrival rate of packets at $CH_i$ is greater than the service rate at $CH_i$. $\Sigma_{i=1}^{N'}\lambda_i \leq \mu_i$, this implies that queues at $CH_i$ increases without bounds causing an increase in E ($DEL_a$) and EPLR. There will be a dedicated connection to the set of base stations, either from the cluster head or a sub-cluster head, which are in the vicinity of the $CH_i$. The cluster device get resources for transmission from the serving or master base station.

The secondary cluster devices $CM_k$ (where k∈{1, 2 ... n}) are grouped into sub-clusters (grouping of sub-clusters) that are then associated to particular BSk (where k∈{j+1, j+2 ... m}) from which it obtain resources for communication, wherein BSk (where k∈{j+1, j+2 ... m}) are assumed to be the in descending order of received SINR by the cluster head $CH_i$. The grouping of sub-clusters within a cluster comprises Congestion Level Based sub-cluster formation and SINR Based sub-cluster formation.

Figure 10:
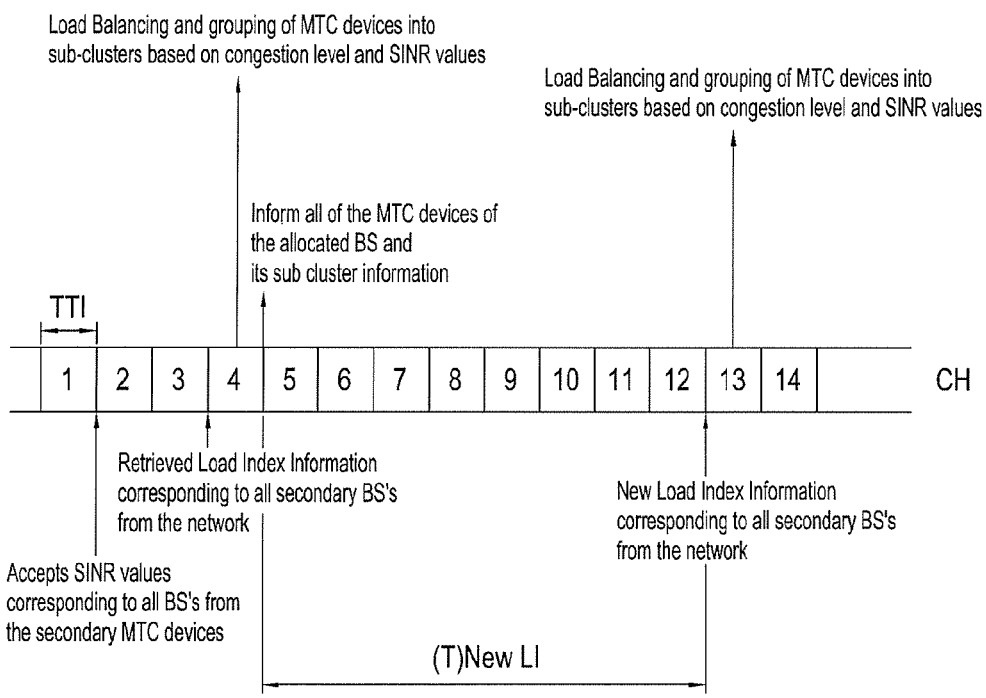
FIG. 10 is a schematic diagram illustrating a load index and SINR based sub-cluster information according to an embodiment of the present disclosure.

FIG. 10 is a schematic diagram illustrating a load index and SINR based sub-cluster information, according to an embodiment of the present disclosure. In a network assisted grouping, network ($BS_j$) gives the information of the congestion level of the base stations $BS_k$ (where k∈{j+1, j+2 ... m}). Depending on the information provided by the network, the congestion level based grouping is based on the information of Load Index (LI) of BS's $BS_k$ (where k∈{j+1, j+2 ... m}). Load index, as per definition provides time average occupancy of the physical resources at each BS. The primary network ($BS_j$) asks for the Load Index from the secondary BS's via the BACK HAUL link and forward to $CH(CH_i)$ the Load Index values $LI_k$ (where k∈{j+1, j+2 ... m}) corresponding to secondary BS's through the dedicated connection. The Load index (LI, ratio of free to allocated resources) of a particular BS is calculated on taking the time average of 'n' samples of load index samples a certain time interval.

$$(LI)\text{retrieved} = \{\Sigma_{i=1}^{n}(LI)i\}/n$$

If the load index $\{LI_{retrieved}\}$ of any network is too less i.e., the network is too congested to provide resources for the MTC devices. If the load index $\{LI_{retrieved}\}$ is very high i.e., very few devices are using that network. From the power optimization purpose, it is required to power shut down such BS. The MTC devices must not be allocated to the network if the load index is very less or very high. Instead shifting of current devices to other BS helps to shut down the serving BS. A threshold (TH) is to be defined for the Load Index values such that the MTC devices must not be associated to the network, if the Load index values $LI_k$ (where k∈{j+1, j+2 ... m}) is greater than the $TH_{max}$ load Index or less than the $TH_{min}$ load Index.

For allocation of MTC devices to a particular BS, the Load Index value $LI_k$ (where k∈{j+1, j+2 ... m}) should be in the range:

$TH_{min}$ load Index<$LI_k$<$TH_{max}$ Load Index (where k∈{j+1, j+2 ... m})

The base station with the lowest congestion level is allocated first to the number of the cluster devices according to the load index of the base station $LI_k$ and the devices are selected on the basis of SINR values to that BS. The secondary MTC devices within a cluster are supposed to s end the SINR values corresponding to all of the secondary BS's to the cluster head. SINR values to that BS of the devices can be as shown in Table 1.

TABLE 1

The grouping of secondary MTC devices is performed at the cluster head:

|  | BS-1 | BS-2 | BS-3 |
| --- | --- | --- | --- |
| Device 1 | (SINR)1,1 | (SINR)1,2 | (SINR)1,3 |
| Device 2 | (SINR)2,1 | (SINR)2,2 | (SINR)2,3 |
| Device 3 | (SINR)3,1 | (SINR)3,2 | (SINR)3,3 |
| Device 4 | (SINR)4,1 | (SINR)4,2 | (SINR)4,3 |
| Device 5 | (SINR)5,1 | (SINR)5,2 | (SINR)5,3 |

The grouping is done such that if there are n MTC devices that are to be grouped in BS's BSk (where k∈{j+1, j+2 ... m}) arranged in an increasing congestion level sequence with info of Load Index.

$BS_{j+1} \rightarrow (LI_{j+1})$ MTC devices
$BS_{j+2} \rightarrow (LI_{j+2})$ MTC devices
$BS_{j+3} \rightarrow (LI_{j+3})$ MTC devices
:
:
$BS_m \rightarrow (n-((LI_{j+1})+(LI_{j+2})+ \ldots +(Li_{m-1})))$
Where $(CL)_{j+1}<(CL)_{j+2}<(CL)_{j+3}< \ldots <(CL)_m$,
$TH_{min}$ Load Index<$LI_k$ (where k∈{j+1, j+2 ... m})<$TH_{max}$ Load Index Further triggering condition is added. The devices $CM_k$ (where k∈{1, 2 ... n}) are first allocated to the BS with lowest Congestion Level ($BS_{j+1}$) depending on their SINR values to that BS. The number of devices allocated is the Load Index of that BS ($LI_{j+1}$). In the same way all BS's $BS_k$ are allocated to the secondary MTC devices in the way that the base station, $BS_k$ with lowest congestion level is allocated first and then moving on to the highest. The MTC devices are grouped into sub-clusters SCk (where k∈{j+1, j+2 ... m}) based on the SINR values corresponding to different $BS_k$ and the load index information of the BS's. Since the load index of the BS's keeps on changing, the grouping of devices needs to be updated corresponding to the new load index values of BS's. The time interval ($T_{new}$ LI) after which new load index is retrieved and grouping needs to be updated depends on the scheduling mechanism.

CASE 1—$LI_{new}>LI_{previous}$

When the new load index (LInew) of a particular BS ($BS_{j+1}$) is greater than the number of devices allocated to it (the previous load index) i.e., it can allocate resources to more devices.

$LI_{new}<TH_{max}$ Load Index

In this case, $BS_{j+1}$ can be allocated to more of the MTC devices, so the MTC devices those are allocated to the BS with high congestion level ($BS_m$, $BS_{m-1}$) for those $Li_m$, $Li_{m-1}<TH_{min}$ load index is allocated to this Base Station ($BS_{j+1}$).

The grouping will be such that if there are 'n' MTC devices that are to be grouped in BS's BSk (where $k \in \{j+1, j+2 \ldots m\}$), arranged in an increasing congestion level sequence according to the load index $LI_k$ (where $k \in \{j+1, j+2 \ldots m\}$), the $BS_{j+1}$ can be allocated further to 'x' devices.

$(BS_{j+1}) \rightarrow ((LI_{j+1})+x)$ MTC devices
$(BS_{j+2}) \rightarrow (LI_{j+2})$ MTC devices
:
:
$(BS_{m-1}) \rightarrow ((Li_{m-1})-(Li_{m-1}))$ MTC devices
$(BS_m) \rightarrow ((LI_m)-(LI_m))$ MTC devices Where $CL_{j+1} < CL_{j+2} < CL_{j+3} < \ldots < CL_m$, the 'x' devices can be devices that are allocated to $BS_{m-1}$ and $BS_m$.

The $BS_{m-1}$ and $BS_m$ is removed from the cloud cell with respect to this cluster, as devices allocated to these BS's earlier are now allocated to $BS_{j+1}$.

CASE 2—$LI_{new} < LI_{previous}$ and $LI_{new} < TH_{min}$ Load Index

When the load index retrieved $LI_{new}$ from a particular BS $(BS_{j+1})$ is less than the previous load index $LI_{previous}$ i.e., it cannot allocate resources efficiently to all the MTC devices allocated to this BS $(BS_{j+1})$ earlier. In this case, as the number of MTC devices allocated to BS $(BS_{j+1})$ is much higher than the resources it can allocate to MTC devices, so the extra MTC devices that can create congestion on this BS is shifted to next BS, provided that the next BS should have a load index higher than the resources allocated to it.

If the BS next to the $BS_{j+1}$ also have a load index lower than the required, then devices from $BS_{j+1}$ and $BS_{j+2}$ will be shifted to $BS_{j+3}$.

The grouping is such that if there are MTC devices that are to be grouped in BS's BSk (where $k \in \{j+1, j+2 \ldots m\}$) arranged in an increasing congestion level sequence according to the load index, the BSj+1 cannot allocate devices among the devices allocated to it earlier.

$(BS_{j+1}) \rightarrow ((LI_{j+1})-x)$ MTC devices
$(BS_{j+2}) \rightarrow ((LI_{j+2})+x)$ MTC devices
:
:
$(BS_m) \rightarrow (LI_m)$ MTC devices Where $(CL)_{j+1} < (CL)_{j+2} < (CL)_{j+3} < \ldots < (CL)_m$, $(LI)_{New} \rightarrow (LI_{j+1})-x$ and the $BS_{j+1}$ can allocate the 'x' devices to the BSj+2.

CASE 3—LI new>(TH)max load Index

When the load index retrieved (LInew) from a particular BS (BSj+1) is higher than the maximum bound of load index i.e., it contains very few number of devices. In this case, where the (BSj+1) has a load index higher than the upper bound of Load Index, the MTC devices associated with this BS will be shifted to next BS for power optimization (as proposed by 3GPP), provided that the next BS should have a load index higher than the previous value. In such case $(BS_{j+1})$ can be power shut down in order to optimize the BS power. If the BS next to the $BS_{j+1}$ also has a load index higher than the threshold, then devices from $BS_{j+1}$ and $BS_{j+2}$ will be shifted to $BS_{j+3}$. The grouping will be such that if there are 'n' MTC devices that are to be grouped in BS's BSk (where $k \in \{j+1, j+2 \ldots m\}$) arranged in an increasing congestion level sequence according to the load index, the MTC devices associated to BSj+1 will be shifted to BSj+2 for power optimization.

$(BS_{j+1}) \rightarrow ((LI_{j+1})-(LI_{j+1}))$ MTC devices
$(BS_{j+2}) \rightarrow ((LI_{j+2})+(LI_{j+1}))$ MTC devices
:
:
$(BS_m) \rightarrow (LIm)$ MTC devices
Where $(CL)_{j+1} < (CL)_{j+2} < (CL)_{j+3} < \ldots < (CL)_m$
$LI_{New} > TH_{max}$ load Index SINR Based Sub-Cluster Formation When there is no information of the load index values of BS's from the network, then the sub-clusters SCk (where $k \in \{j+1, j+2 \ldots m\}$) are formed on the basis of the SINR values corresponding to BS's $BS_k$ (where $k \in \{j+1, j+2 \ldots m\}$). The $CH_i$ will retrieve the SINR values from each of the secondary MTC devices $CM_k$ (where $k \in \{1, 2 \ldots n\}$) corresponding to the BS's BSk (where $k \in \{j+1, j+2 \ldots m\}$) and then divides the MTC devices into sub-clusters accordingly. The MTC devices of sub-clusters formed (sub-cluster members) will be having the high SINR values corresponding to the particular BS allocated to them and sub-Cluster Head sCHk (where $k \in \{j+1, j+2 \ldots m\}$) is also assigned for each sub-cluster SCk (where $k \in \{j+1, j+2 \ldots m\}$) which will do the contention resolution in its sub-cluster. The conditions for a cluster device to become a sub-cluster head will be same as the one described earlier in cluster formation model in case of single BS.

The s-CH sCHk (where $k \in \{j+1, j+2 \ldots m\}$) asks for resources from the BS {BSk where $k \in (j+1, j+2 \ldots m)$} for the active devices in its sub-cluster via dedicated connection to associated BS.

TABLE 2

|  | BS-1 | BS-2 | BS-3 |
| --- | --- | --- | --- |
| Device 1 | (SINR)1,1 | (SINR)1,2 | (SINR)1,3 |
| Device 2 | (SINR)2,1 | (SINR)2,2 | (SINR)2,3 |
| Device 3 | (SINR)3,1 | (SINR)3,2 | (SINR)3,3 |
| Device 4 | (SINR)4,1 | (SINR)4,2 | (SINR)4,3 |
| Device 5 | (SINR)5,1 | (SINR)5,2 | (SINR)5,3 |
| Device 6 | (SINR)6,1 | (SINR)6,2 | (SINR)6,3 |

The grouping on the basis of SINR values to secondary BS's can be shown by the followi ng example. Assume there are '6' secondary MTC devices in a cluster and '3' secondary BS's and the SINR values as shown earlier-SINR values to that BS of the devices can be as shown in Table 2.

$(BS1) \rightarrow \{(SINR)_{1,1}; (SINR)_{2,1}; (SINR)_{3,1}; (SINR)_{6,1}; (SINR)_{4,1}; (SINR)_{5,1}\}$ $(BS2) \rightarrow \{(SINR)_{2,2}; (SINR)_{5,2}; (SINR)_{6,2}; (SINR)_{1,2}; (SINR)_{3,2}; (SINR)_{4,2}\}$ $(BS3) \rightarrow \{(SINR)_{4,3}; (SINR)_{3,3}; (SINR)_{2,3}; (SINR)_{1,3}; (SINR)_{5,3}; (SINR)_{6,3}\}$ The examples are SNR values in the decreasing order corresponding to each BS.

Device 1→$\{(SINR)_{1,1}; (SINR)_{1,2}; (SINR)_{1,3}\}$
Device 2→$\{(SINR)_{2,2}; (SINR)_{2,1}; (SINR)_{2,3}\}$
Device 3→$\{(SINR)_{3,3}; (SINR)_{3,1}; (SINR)_{3,2}\}$
Device 4→$\{(SINR)_{4,3}; (SINR)_{4,1}; (SINR)_{4,2}\}$
Device 5→$\{(SINR)_{5,2}; (SINR)_{5,3}; (SINR)_{5,1}\}$
Device 6→$\{(SINR)_{6,2}; (SINR)_{6,1}; (SINR)_{6,3}\}$ The examples are SNR values of devices to BS's in the decreasing order. According to one embodiment, the grouping with the 'AND' of these two set of sequences can be performed.

The groups are formed on the basis of the sequences of SINR values corresponding to the BS's and devices:

(BS)1→{device1}
(BS)2→{device2, device 5, device 6}
(BS)3→{device 4, device 3}

The devices 1, 2 and 4 are the sCH's of the sub-clusters formed corresponding to the base station 1, 2 and 3 respectively as they have the highest SINR value corresponding to that BS. After grouping by any of the method, the grouping info message is to be sent to all MTC devices from Cluster head (CHi).

The grouping info message: (secondary BS's {BSk where k∈(j+1, j+2 ... m)})
Device Association to BS Sub-Cluster Head
{CM2, CM3, ..., CMm}→BSj+1 sCHj+1→CM2
{CM1, CM5, ..., CMp}→BSj+2 sCHj+2→CM1
⋮
{CMi, CM21, ..., CMz}→BSm sCHm→CMi
Hybrid Grouping:

Hybrid grouping based on the joint optimization of SINR and load balancing is not in the scope of this document and left for the future work. Once grouping is done, there are two ways in which a dedicated channel can be formed from the sub-cluster to the respective BS such as CH based dedicated connection and Sub-cluster head (sCH) based dedicated connection.

Figure 11:
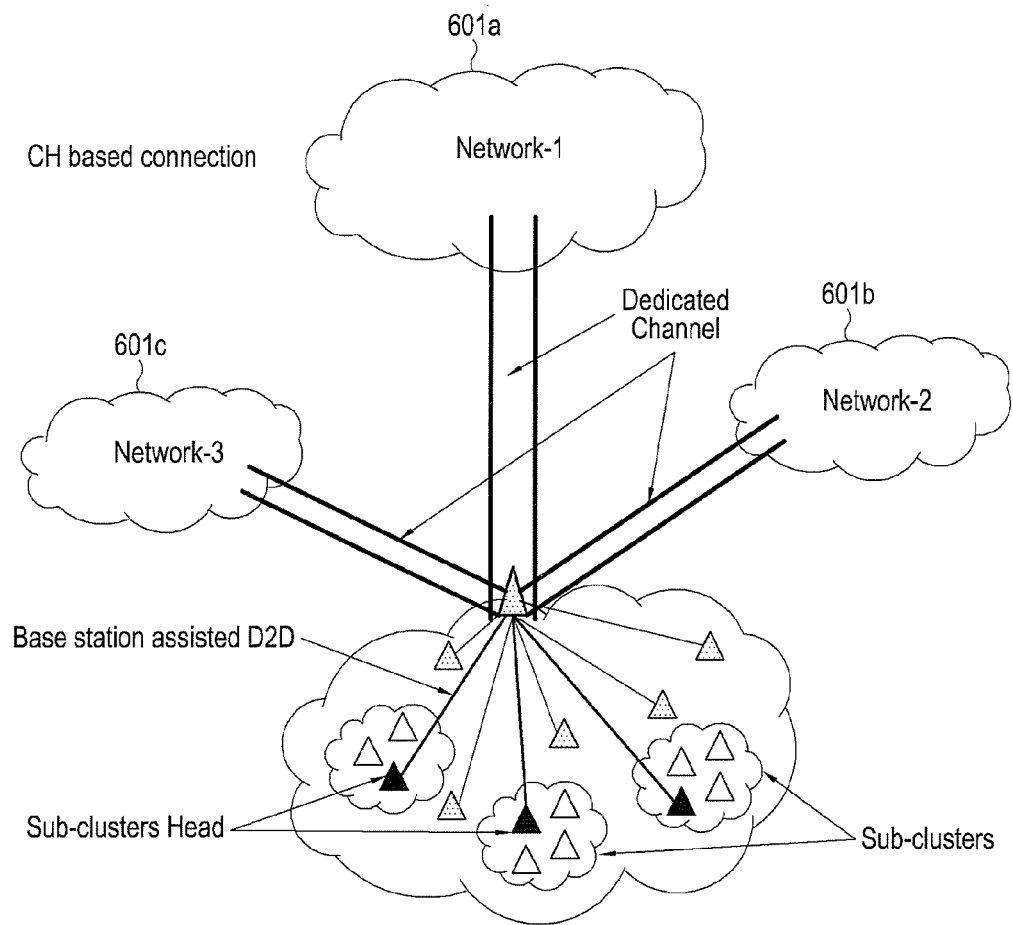
FIG. 11 is a scenario diagram illustrating data transmission through a cluster head dedicated connection based communication for MTC devices for multiple base stations, according to an embodiment of the present disclosure.

FIG. 11 is a scenario diagram illustrating data transmission through a cluster head dedicated connection based communication for MTC devices for multiple base stations, according to an embodiment of the present disclosure. In a CH based connection, there will be a dedicated connection from the CHi to the plurality of base stations {$BS_k$ where k∈(j+1, j+2 ... m)} and all the communication from the sub-clusters to their respective BS is performed through the cluster head. Each of the MTC devices in a cluster will update the CHi with its information i.e., its activation. The contention resolution of each sub-cluster will be handled at the CHi i.e., the CH will accordingly request for resources from a particular base station whenever a transmission is ready for any sub-cluster device. There will be the chances of congestion at a respective base station and sub-cluster devices don't get resources for communication and thus disruption in the MTC occurs. Each BS will have a secondary base station ('n' secondary BS's) to whom it can handover the devices whenever there is a chance of disruption in M2M communication. The shifting of devices (CM1) from the sub-cluster corresponding to the serving BS (BS-2) to the sub-cluster corresponding to the secondary BS ($BS_3$). The shifting takes place when a half of the delay tolerance interval is passed and the device (CM1) does not get the resources associated base station BS (BS-2). The secondary BS's (BS-2) then informs the cluster head of the secondary BS (BS-3) on which devices (CM-1) corresponding to its sub-cluster can shift.

Figure 12:
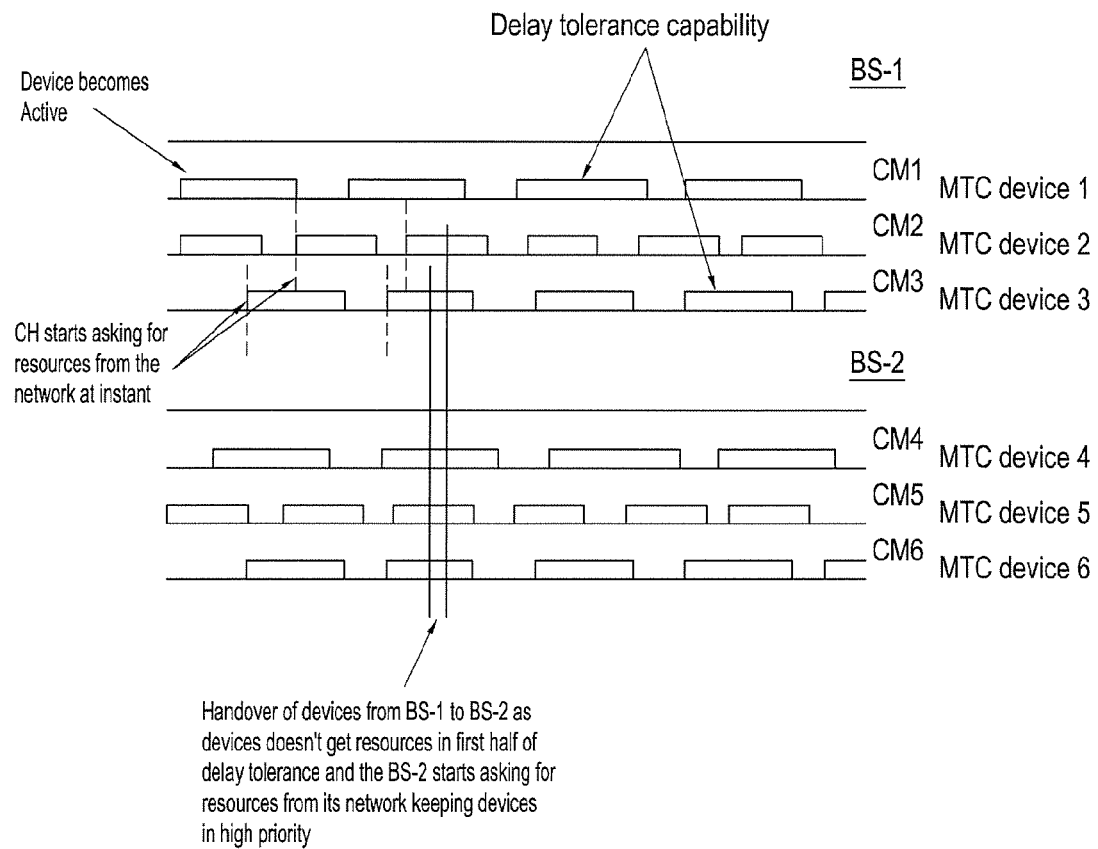
FIG. 12 is a schematic representation of a timing diagram for multiple base station cluster head dedicated connection based communication for MTC devices according to an embodiment of the present disclosure.

FIG. 12 is a schematic representation of a timing diagram for multiple base station cluster head dedicated connection based communication for MTC devices, according to an embodiment of the present disclosure. Each of the MTC devices in a cluster will update the cluster head with its activation status. The cluster head will accordingly request for resources from a particular base station whenever a transmission is ready for any sub-cluster device. There will be the chances of congestion at a respective base station and sub-cluster devices don't get resources for communication and thus disruption in the MTC occurs. The cluster head will then handover the MTC devices from a first base station to a second base station when it does not get network resources in the first half of the delay tolerance. Further, the second base station requests for resources from its network keeping the MTC devices in high priority.

Figure 13:
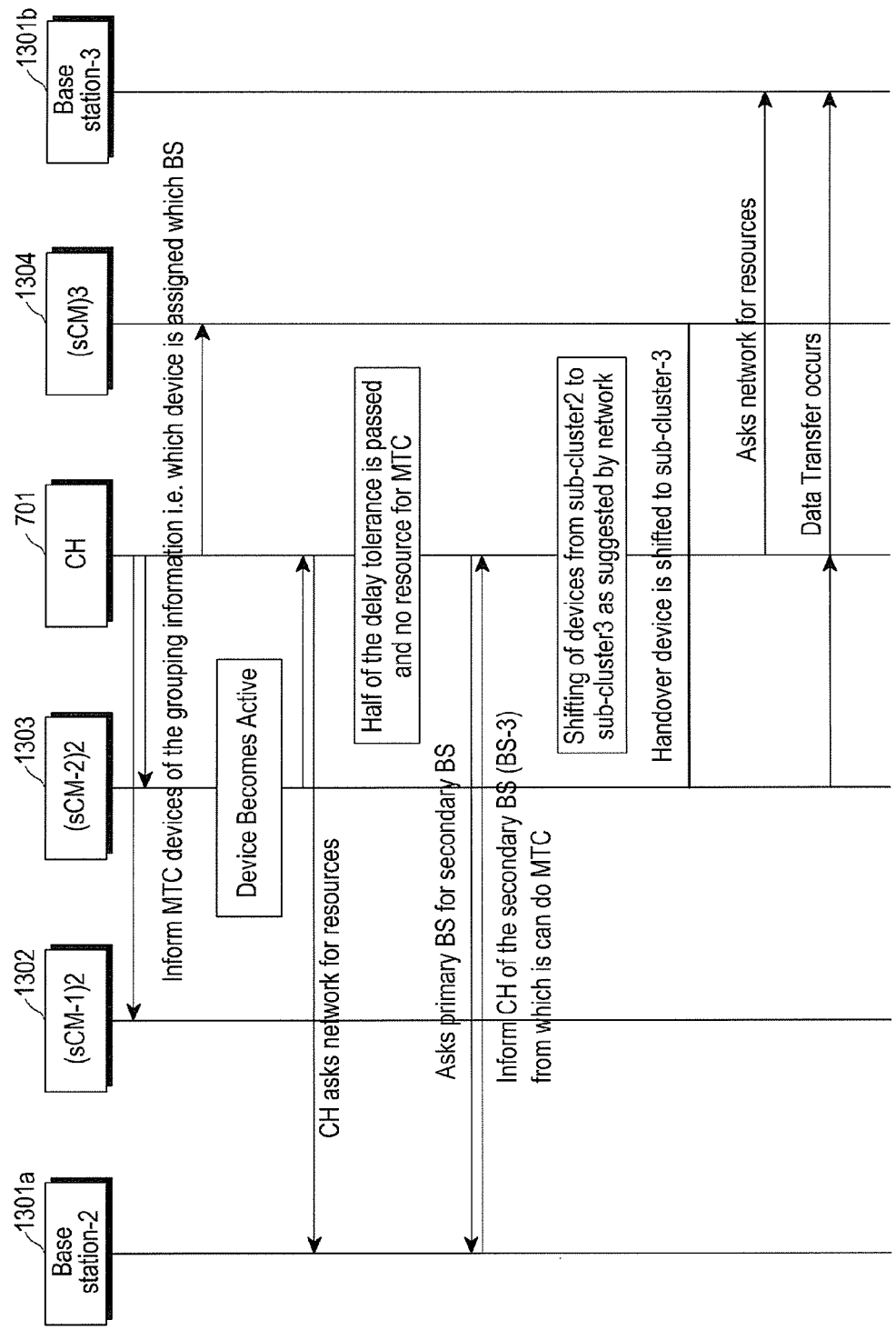
FIG. 13 is a flow diagram illustrating a messaging sequence for cluster head dedicated connection based communication for MTC devices according to an embodiment of the present disclosure.

FIG. 13 is a flow diagram illustrating a messaging sequence for cluster head dedicated connection based communication for MTC devices, according to an embodiment of the present disclosure. The cluster head 701 informs the plurality of MTC devices in a cluster of a primary base station 1301a to which each MTC device is assigned. When the MTC device becomes active, the MTC device updates the activation status to the respective cluster head 701. The cluster head 701 then requests for network resources from a particular base station whenever a transmission is ready for a sub-cluster MTC device. The cluster head 701 then requests the primary base station (BS-2) 1301a to provide a secondary base station (BS-3) 1301b if there is a disruption in the communication due to unavailability of network resources. The primary base station 1301a informs the cluster head 701 of the secondary base station 1301b from which it can perform MTC communication. The cluster head 701 then shifts the one or more MTC devices from a sub-cluster corresponding to the primary base station (BS-2) 1301a to a sub-cluster corresponding to the secondary base station (BS-3) 1301b as suggested by the network. The shifting occurs when a half of a delay tolerance associated with the one or more MTC devices is over and the MTC device does not get the network resources associated with the base station. The cluster head 701n then inquires the secondary base station (BS-3) 1301b for network resources and initiate the data communication for the MTC devices.

Figure 14:
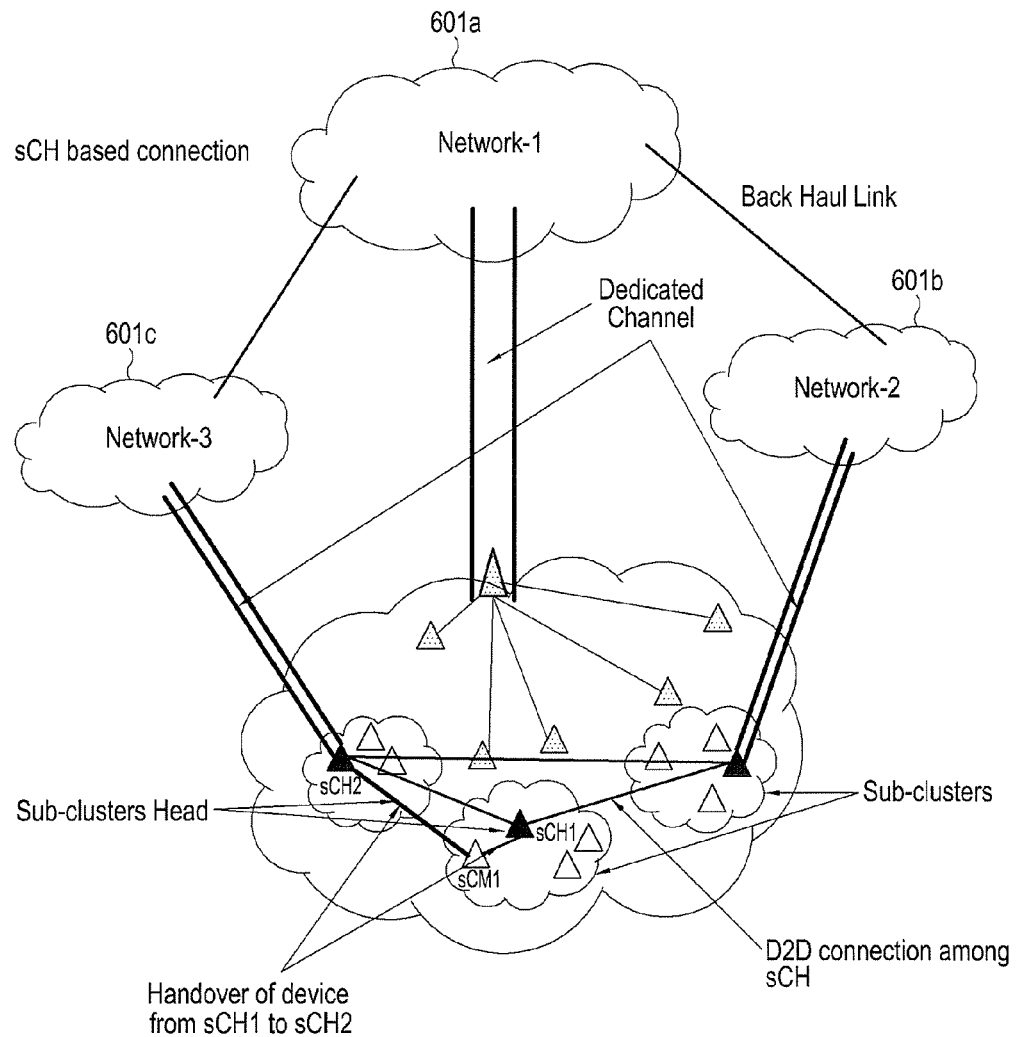
FIG. 14 is a scenario diagram illustrating data transmission through a sub-cluster head dedicated connection based communication for MTC devices for multiple base stations according to an embodiment of the present disclosure.

FIG. 14 is a scenario diagram illustrating data transmission through a sub-cluster head dedicated connection based communication for MTC devices for multiple base stations, according to an embodiment of the present disclosure. In a sub-cluster head (sCH) based dedicated connection, there is a dedicated connection from the sub-cluster head $sCH_k$ {where k∈(j+1, j+2 ... m)} of a particular sub-cluster $SC_k$ {where k∈(j+1, j+2 ... m)} to the associated base station. The contention in each sub-cluster is handled at the sCH of that sub-cluster as the dedicated connection is from the sCH to the BS. The sCH starts the connection request to the associated BS for resources, as soon as any UE within its sub-cluster becomes active.

The CHi after grouping of sub-clusters forwards the information message (grouping information of secondary MTC devices) to all of the MTC devices so that each MTC device knows which BS is associated to which device. Each of the sCH knows information about the sCH's corresponding to different BS's. The handover message from a particular sCH (sCH1) to other sCH (sCH2) includes the information of the MTC devices that is to be handover. The grouping information that is sent to each of the MTC devices from the CHi contains the information as provided below.

| Device association to BS | Sub-cluster head |
| --- | --- |
| {CM2,CM3,...,CMm} → $BS_{j+1}$ | $sCH_{j+1}$ → CM2 |
| {CM1,CM5,...,CMp} → $BS_{j+2}$ | $sCH_{j+2}$ → CM1 |

In the sCH based connection, the delay tolerance is updated to half of its original value for communication from a primary BS allocated to it. If the delay tolerance is passed and still the MTEC device does not get any resources from the associated BS (in case of congestion at the associated BS), then it will be hand over to the secondary BS for resources. The secondary BS corresponding to each BS will be then selected for handover of devices. The sCH (sCH1) will send the information to the sCH (sCH2) corresponding to the secondary base station (BS3), about the devices (sCM1) that require resources for communication. The sCH (sCH2) handover the MTC devices (sCM1) as its sub-cluster members and start the request for resources from its base station.

Figure 15:
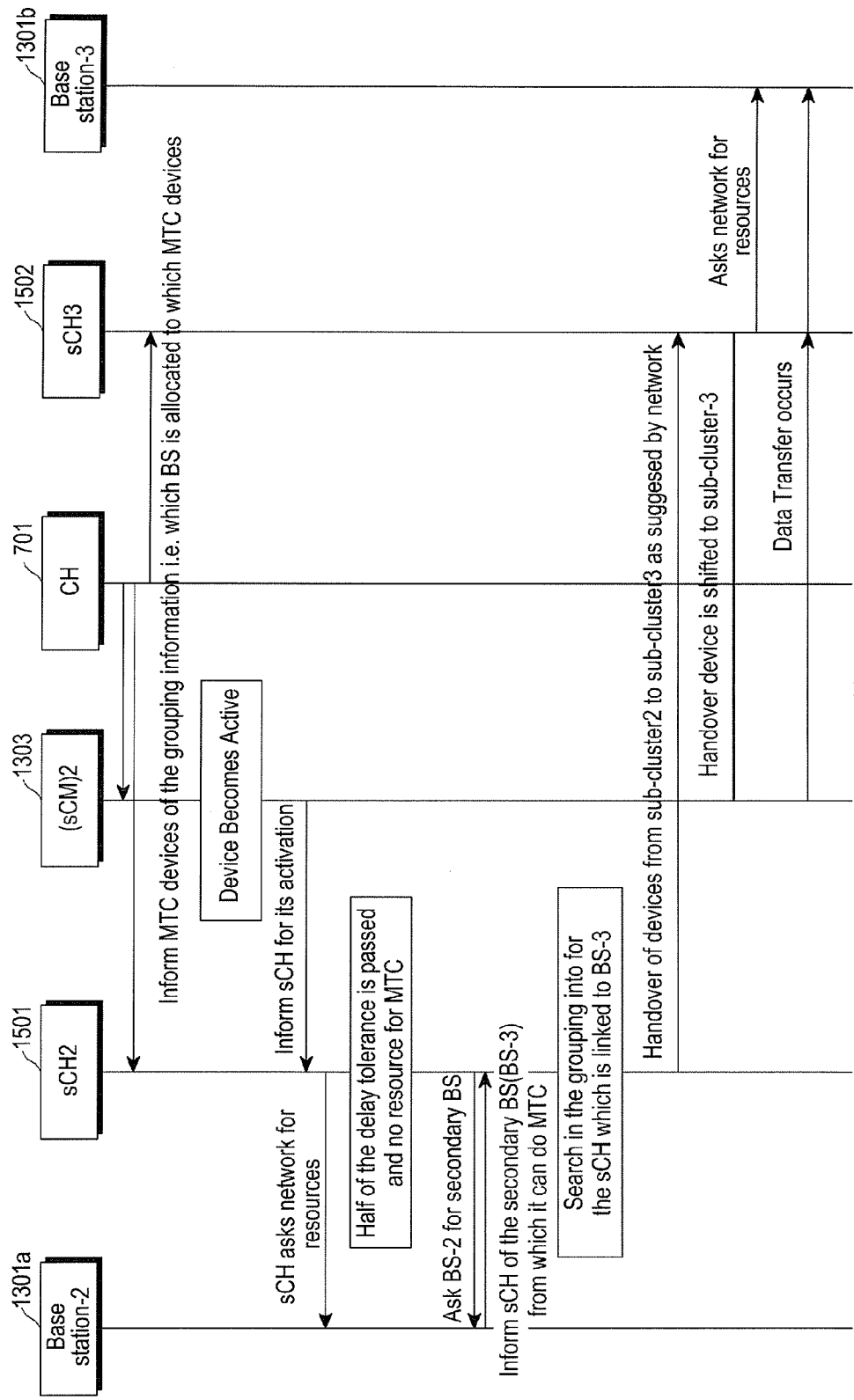
FIG. 15 is a flow diagram illustrating a messaging sequence for sub-cluster head dedicated connection based communication for MTC devices according to an embodiment of the present disclosure.

FIG. 15 is a flow diagram illustrating a messaging sequence for sub-cluster head dedicated connection based communication for MTC devices, according to an embodiment of the present disclosure. The cluster head 701 informs the plurality of TC devices in a cluster of the grouping information that which base station is allocated to which MTC device. The MTC device on activation informs the activation status to the sub-cluster head. The sub-cluster head requests for a network resource from a particular base station whenever a transmission is ready for a sub-cluster MTC device 1303. The sub-cluster head requests for a secondary base station (BS-3) 1301b if a half of the delay tolerance is passed and no resource is found for MTC. The primary base station 1301a then provides information of the secondary base station 1301b from which the sub-cluster head sCH2 1501 can initiate MTC. The sub-cluster head sCH2 1501 then searches in the grouping information for the sub-cluster head which is linked to the secondary base station 1301b. The sub-cluster then performs handover of the MTC devices from a sub-cluster corresponding to the primary base station 1301a to a sub-cluster 1501b corresponding to the secondary base station 1301b as suggested by the network 601. The sub-cluster head 1501 of the secondary base station 1301b informs on which sub-cluster the one or more MTC devices can shift. The sub-cluster head 1501b then initiates data traffic transfer from the one or more MTC devices to the secondary base station 1301b through the connection established between the sub-cluster head 1501b and the secondary base station 1301b.

According to an embodiment of the present disclosure, the sub-cluster head 1501b request for the secondary base station 1301b when a half of a delay tolerance associated with the one or more MTC devices is over and the MTC device does not get the network resources associated with the base station. Each sub-cluster head serving one or more related MTC devices is connected to a serving base station through a dedication connection.

According to an embodiment herein, the MTC devices of one sub-cluster joins another sub-cluster through the device to device communication during at least one of expiry of the delay tolerance of the MTC device and the MTC device is in a sub-cluster does not get resources from the associated base station and if the sub-cluster head connected to macro base station cannot serve the MTC device in the sub-cluster.

Figure 16:
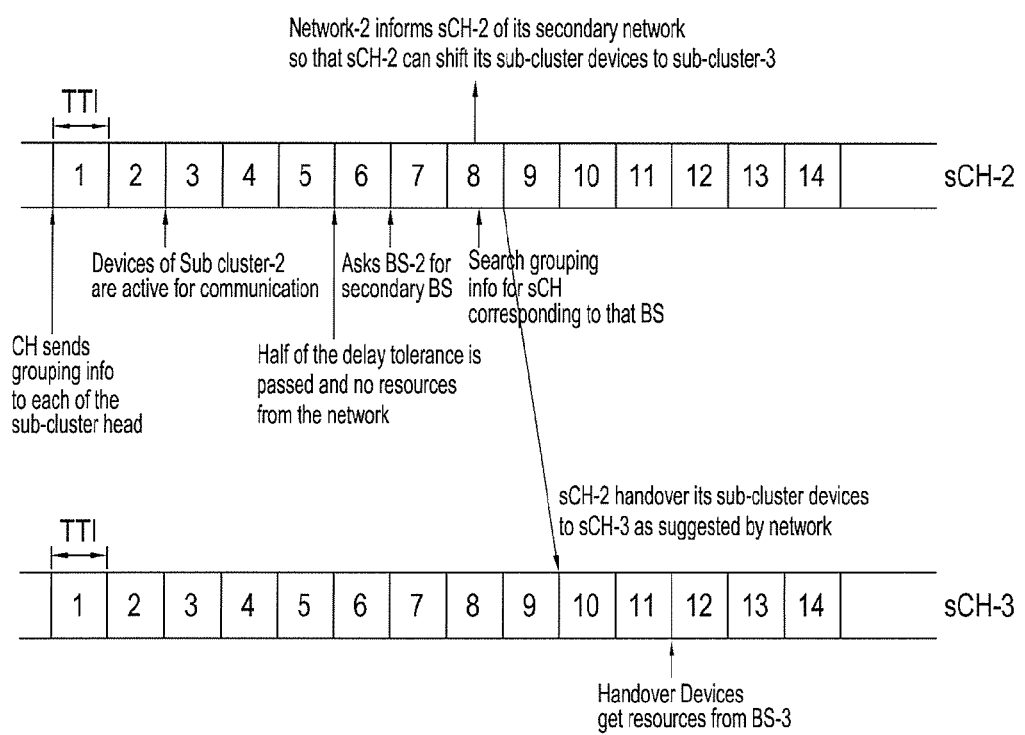
FIG. 16 is a schematic representation of a timing diagram for multiple base station sub-cluster head dedicated connection based communication for MTC devices according to an embodiment of the present disclosure.

FIG. 16 is a schematic representation of a timing diagram for multiple base station sub-cluster head dedicated connection based communication for MTC devices, according to an embodiment of the present disclosure. As shown in FIG. 16, at t1, the sub-cluster head sends grouping information to each of the cluster head sends grouping information to each of the sub-cluster head. At t2, the MTC devices of subcluster-2 are active for communication. At t5, a half of the delay tolerance is passed and no resources are allocated from the network. At t6, the primary base station asks for secondary base station. At t8, the network informs the sub-cluster head-2 of its secondary network so that the sub-cluster head-2 can shift its sub-cluster devices to sub-cluster-3. Further at t8, the sub-cluster head-2 searches for grouping information for sub-cluster head corresponding to that base station. At t9, sub-cluster head-2 handover its sub-cluster devices to sub-cluster head-3 as suggested by the network. At t11, the handover devices get network resources from secondary base station.

The MTC devices and the base stations (eNBs) of the embodiments of the present disclosure, can adopt any suitable wireless transceiver structures, such as the respective structures of the user equipments and the base stations (eNBs) described in U.S. patent Ser. No. 14/176,919, which was published as U.S. Patent Publication No. US20140242963, the disclosure of which is incorporated by reference in its entirety.

According to an embodiment herein, the clustering based mechanism provides for the cluster head to establish a dedicated connection with eNB and other MTC device only communicate to cluster head and not to the base station. Further a semi-persistence scheduling grant is allocated to a cluster head and the cluster head receives downlink data on behalf of all the MTC devices. MTC cluster head then shares the MTC downlink data to each MTC device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing data communication for machine type communication (MTC) devices in a group-based wireless communication by a cluster head, the method comprising:
   receiving a data traffic transfer request from one or more MTC devices, wherein the data traffic transfer request comprises a buffer occupancy status of the one or more MTC devices;
   sending a dedicated connection request with the buffer occupancy status of the one or more MTC devices to a base station;
   establishing a dedicated connection with the base station for transferring the data traffic from the one or more MTC devices to the base station based on availability of one or more network resources for transferring data traffic, wherein the availability of the one or more network resources is determined based on the buffer occupancy status of the one or more MTC devices by the base station; and
   transferring the data traffic from the one or more MTC devices to the base station through the dedicated connection established between the cluster head and the base station,
   wherein the cluster head is selected for a cluster comprising the one or more MTC devices which are members of the cluster.

2. The method of claim 1, wherein the data transfer request further comprises at least one of an activation status and a delay tolerance of the one or more MTC devices.

3. The method of claim 2, further comprising determining the availability of the one or more network resources for transferring data traffic, wherein the determining comprises:
   creating a priority list of the one or more MTC devices based on a delay tolerance of the one or more MTC devices;
   comparing the delay tolerance of the one or more MTC devices with a time required for establishing the dedicated connection with the base station; and
   triggering the dedicated connection request with the base station when a delay tolerance for a high priority MTC device is equal to a pre-set time based on a result of the comparison;
   wherein the delay tolerance of the one or more MTC devices is a total tolerable time of communication without impacting a quality of service for the one or more MTC devices.

4. The method of claim 1, further comprising:
receiving at least one of an ACK or a NACK message from the base station through the dedicated connection established between the cluster head and the base station; and
relaying at least one of an ACK or NACK message from the base station to a corresponding MTC device.

5. The method as claimed in claim 1, wherein the cluster head establishes and releases the dedicated connection with the base station based on an incoming traffic from the one or more MTC devices.

6. The method as claimed in claim 3, wherein the pre-set time is a time interval required for the establishing of the dedicated connection between the cluster head and the base station.

7. The method as claimed in claim 1, further comprises performing sub-clustering of a plurality of MTC devices within a cluster based on a first set of parameters, wherein the first set of parameters comprises a congestion level and Signal-to-noise ratio (SINR) associated with the plurality of MTC devices.

8. The method as claimed in claim 7, wherein the congestion level based sub-cluster formation is performed based on a load index, wherein the load index is an average of a resource utilization at the base station.

9. The method as claimed in claim 8, further comprising:
redirecting one or more MTC devices assigned to a first base station among the plurality of MTC devices, from the first base station to a second base station if the load index of the second base station is greater than a previous load index and less than a maximum load index, wherein the maximum load index is associated with a maximum availability of network resources.

10. The method as claimed in claim 8, further comprising:
redirecting one or more MTC devices assigned to a first base station among the plurality of MTC devices, from the first base station to a second base station having a load index between a maximum load index and a minimum load index, if the load index of the first base station is less than a previous load index and is equal to or less than the minimum load index, wherein the minimum load index is associated with a minimum availability of network resources.

11. The method as claimed in claim 8, further comprising:
redirecting one or more MTC devices assigned to a first base station among the plurality of MTC devices, from the first base station to a second base station if the load index of the first base station is greater than a maximum load index, and
wherein power the first base station is shut down if the load index of the first base station is greater than the maximum load index.

12. The method as claimed in claim 7, wherein performing sub-clustering of the plurality of MTC devices within the cluster based on a first set of parameters comprises:
retrieving the SINR of each of the plurality of MTC devices with respect to each of a plurality of base stations, wherein the SINR of each of the plurality of MTC devices is reported to a serving base station and the SINR of each of the plurality of MTC devices is shared with
a plurality of neighboring base stations and sorted with respect to each of the plurality of neighboring base stations by the serving base station; and
creating a sub-cluster based on the retrieved SINR of each of the plurality of MTC devices with respect to each of the plurality of neighboring base stations.

13. The method as claimed in claim 7, wherein the cluster head has the highest SINR with serving cell and has decreasing order of SINR for a plurality of neighboring base stations or cooperative base stations which are jointly serving the cluster head.

14. A method for providing data communication for machine type communication (MTC) devices for multiple base-stations in a wireless communication by a cluster head, the method comprising:
informing to one or more MTC devices in a cluster a primary base station to which each of the one or more MTC devices is assigned, wherein an activation of the one or more MTC devices is updated to the cluster head by each of the one or more MTC devices;
requesting for a network resource to the primary base station whenever a transmission is ready for each of the one or more MTC devices;
requesting for providing a secondary base station to the primary base station, if there is a disruption in communication due to unavailability of network resources;
shifting the one or more MTC devices from a sub-cluster corresponding to the primary base station to a sub-cluster corresponding to the secondary base station, wherein the shifting occurs when a half of a delay tolerance associated with the one or more MTC devices is over and the one or more MTC devices do not get the network resources associated with the primary base station; and
informing to the one or more MTC devices the secondary base station on which one or more MTC devices corresponding to the sub-cluster is able to shift.

15. A method for providing data communication for machine type communication (MTC) devices for multiple base-stations in a wireless communication by a first sub-cluster head, the method comprising:
informing to one or more MTC devices in a cluster a primary base station to which each of the one or more MTC devices is assigned, wherein an activation of the one or more MTC devices is updated to the first sub-cluster head by each of the one or more MTC devices;
requesting for a network resource to the primary base station whenever a transmission is ready for each of the one or more MTC devices;
requesting for providing a secondary base station to the primary base station, if there is a disruption in communication due to unavailability of network resources;
receiving information of the secondary base station from which the first sub-cluster head is able to initiate MTC communication;
searching for a second sub-cluster head which is linked to the secondary base station in a grouping information;
shifting the one or more MTC devices from a sub-cluster corresponding to the primary base station to a sub-cluster corresponding to the secondary base station,
receiving, from the second sub-cluster head, to which sub-cluster the one or more MTC devices is able to shift; and
initiating data traffic transfer from the one or more MTC devices to the secondary base station through a dedicated connection established between the second sub-cluster head and the secondary base station.

16. The method as claimed in claim 15, wherein the first sub-cluster head requests to provide the secondary base station when half of a delay tolerance associated with the one or more MTC devices is over and the one or more MTC devices do not get the network resources associated with the primary base station.

17. The method as claimed in claim 15, further comprising:
providing information of the one or more MTC devices that require network resources to the second sub-cluster corresponding to the secondary base station, and
wherein the one or more MTC devices that require network resources are stored as sub-cluster members and network resources from the secondary base station is requested by the second sub-cluster.

18. The method as claimed in claim 15, wherein each of the first sub-cluster head and the second sub-cluster head serving one or more related MTC devices is connected to each of the primary base station and the secondary base station through a dedicated connection.

19. The method of claim 15, further comprising:
providing the grouping information to the one or more MTC devices in the cluster, wherein the grouping information informs the one or more MTC device which base station is associated to which MTC device; and
enabling the one or more MTC devices of the sub-cluster corresponding to the primary base station to join the sub-cluster corresponding to the secondary base station through a device to device communication.

20. The method as claimed in claim 19, wherein the one or more MTC devices of the sub-cluster corresponding to the primary base station joins the sub-cluster corresponding to the secondary base station through the device to device communication during at least one of:
expiry of a delay tolerance of the one or more MTC devices and the one or more MTC devices in the sub-cluster corresponding to the primary base station do not get resources from the primary base station; and
if the first sub-cluster head connected to the primary base station is not able to serve the one or MTC devices in the sub-cluster corresponding to the primary base station.

21. A method for providing data communication for machine type communication (MTC) devices in a group-based wireless communication by a cluster head, the method comprising:
receiving a message from one or more MTC devices for data traffic transfer when the one or more MTC devices are activated, wherein the message comprises a buffer occupancy status of the one or more MTC devices and the cluster head is selected for a cluster comprising the one or more MTC devices which are members of the cluster;
sending a dedicated connection request with the buffer occupancy status of the one or more MTC devices to a base station;
establishing a dedicated connection with the base station for transferring the data traffic from the one or more MTC devices to the base station based on availability of one or more network resources for transferring data traffic, wherein the availability of the one or more network resources is determined based on the buffer occupancy status of the one or more MTC devices by the base station; and
transferring the data traffic from the one or more MTC devices to the base station through the dedicated connection established between the cluster head and the base station.

22. A cluster head for providing data communication for machine type communication (MTC) devices in a group-based wireless communication, the cluster head configured to:
receive a message from one or more MTC devices for data traffic transfer when the one or more MTC devices are activated, wherein the message comprises a buffer occupancy status of the one or more MTC devices and the cluster head is selected for a cluster comprising the one or more MTC devices which are members of the cluster;
send a dedicated connection request with the buffer occupancy status of the one or more MTC devices to a base station;
establish a dedicated connection with a base station for transferring the data traffic from the one or more MTC devices to the base station based on availability of one or more network resources for transferring data traffic, wherein the availability of the one or more network resources is determined based on the buffer occupancy status of the one or more MTC devices by the base station; and
transfer the data traffic from the one or more MTC devices to the base station through the dedicated connection established between the cluster head and the base station.

23. The cluster head as claimed in claim 22, wherein the cluster head further configured to perform sub-clustering of a plurality of MTC devices within the cluster based on a first set of parameters, wherein the first set of parameters comprises a congestion level and Signal-to-noise ratio (SINR) associated with the plurality of MTC devices.

24. A cluster head for providing data communication for machine type communication (MTC) devices for multiple base-stations in a wireless communication, the cluster head configured to:
inform to one or more MTC devices in a cluster a primary base station to which each of the one or more MTC devices is assigned;
request for a network resource to the primary base station whenever a transmission is ready for each of the one or more MTC devices;
request for providing a secondary base station to the primary base station, if there is a disruption in communication due to unavailability of network resources;
shift the one or more MTC devices from a sub-cluster corresponding to the primary base station to a sub-cluster corresponding to the secondary base station, wherein the shifting occurs when half of a delay tolerance associated with the one or more MTC devices is over and the one or more MTC devices do not get the network resources associated with the primary base station; and
inform to the one or more MTC devices the secondary base station on which one or more MTC devices corresponding to the sub-cluster is able to shift.

25. A first sub-cluster head for providing data communication for machine type communication (MTC) devices for multiple base-stations in a wireless communication, the first sub-cluster head configured to:
inform to one or more MTC devices in a cluster a primary base station to which each of the one or more MTC devices is assigned;
request for a network resource to the primary base station whenever a transmission is ready for each of the one or more MTC devices;

request for providing a secondary base station to the primary base station, if there is a disruption in communication due to unavailability of network resources;

receive information of the secondary base station from which the first sub-cluster head is able to initiate MTC communication;

search for a second sub-cluster head which is linked to the secondary base station in a grouping information;

shift the one or more MTC devices from a sub-cluster corresponding to the primary base station to a sub-cluster corresponding to the secondary base station, receive, from the second sub-cluster head, to which sub-cluster the one or more MTC devices is able to shift; and initiate data traffic transfer from the one or more MTC devices to the secondary base station through a dedicated connection established between the second sub-cluster head and the secondary base station.

26. The first sub-cluster head as claimed in claim 25, wherein the first sub-cluster head is further configured to:

provide information of the one or more MTC devices that require network resources to the second sub-cluster corresponding to the secondary base station, and wherein the one or more MTC devices that require network resources are stored as sub-cluster members and network resources from the secondary base station is requested by the second sub-cluster head, and wherein the first sub-cluster head further configured to:

provide the grouping information to the one or more MTC devices in the cluster, wherein the grouping information, informs the one or more MTC devices which base station is associated to which MTC device; and enable the one or more MTC devices of the sub-cluster corresponding to the primary base station to join the sub-cluster corresponding to the secondary base station through a device to device communication.

27. The first sub-cluster head as claimed in claim 25, wherein each of the first sub-cluster head and the second sub-cluster head serving one or more related MTC devices is connected to each of the primary base station and the secondary base station through a dedicated connection.

* * * * *